(12) United States Patent
Pitwon

(10) Patent No.: US 7,490,993 B2
(45) Date of Patent: Feb. 17, 2009

(54) ADAPTER FOR AN OPTICAL PRINTED CIRCUIT BOARD, AN OPTICAL PRINTED CIRCUIT BOARD AND A METHOD OF CONNECTING AN ADAPTER TO AN OPTICAL PRINTED CIRCUIT BOARD

(75) Inventor: Richard Charles Alexander Pitwon, Fareham (GB)

(73) Assignee: Xyratex Technology Limited, Havant, Hampshire (GB)

( * ) Notice: Subject to any disclaimer, the term of this patent is extended or adjusted under 35 U.S.C. 154(b) by 0 days.

(21) Appl. No.: 12/026,927

(22) Filed: Feb. 6, 2008

(65) Prior Publication Data

US 2008/0199132 A1 Aug. 21, 2008

Related U.S. Application Data

(60) Provisional application No. 60/890,346, filed on Feb. 16, 2007.

(51) Int. Cl.
G02B 6/36 (2006.01)
H04B 10/00 (2006.01)
(52) U.S. Cl. .............. 385/53; 385/14; 385/55; 385/59; 385/76; 385/77; 385/88; 385/92; 398/135; 398/139
(58) Field of Classification Search .......... 385/53, 385/55, 56, 58, 59, 70, 71, 14, 76, 77, 88, 385/89, 92, 94, 139, 49, 52; 439/43, 44, 439/493, 577; 398/135, 139
See application file for complete search history.

(56) References Cited

U.S. PATENT DOCUMENTS

| 5,930,428 | A  | * | 7/1999 | Irwin et al. ............ 385/88 |
| 6,305,848 | B1 | * | 10/2001 | Gregory .............. 385/53 |
| 6,511,234 | B1 |   | 1/2003 | Marjakangas .......... 385/88 |
| 6,588,943 | B1 |   | 7/2003 | Howard .............. 385/88 |
| 6,698,937 | B2 | * | 3/2004 | Grimes et al. ......... 385/53 |
| 6,811,326 | B2 | * | 11/2004 | Keeble et al. ......... 385/92 |
| 6,832,858 | B2 | * | 12/2004 | Roth et al. ........... 385/71 |
| 2005/0047717 | A1 | * | 3/2005 | Simons et al. ........ 385/33 |
| 2008/0013880 | A1 | * | 1/2008 | Pitwon ............... 385/14 |

FOREIGN PATENT DOCUMENTS

WO 2006/129069 12/2006

OTHER PUBLICATIONS

European Search Report dated Jul. 9, 2007, 5 pages.

* cited by examiner

*Primary Examiner*—Brian M Healy
(74) *Attorney, Agent, or Firm*—Pillsbury Winthrop Shaw Pittman LLP

(57) ABSTRACT

The invention provides an adapter for an optical printed circuit board, the adapter comprising a socket for receiving a daughter card for connecting to a said optical printed circuit board; and a connector for engagement with the optical printed circuit board arranged such that when the connector engages with the optical printed circuit board an optical connection is established between the optical printed circuit board and the adapter.

22 Claims, 30 Drawing Sheets

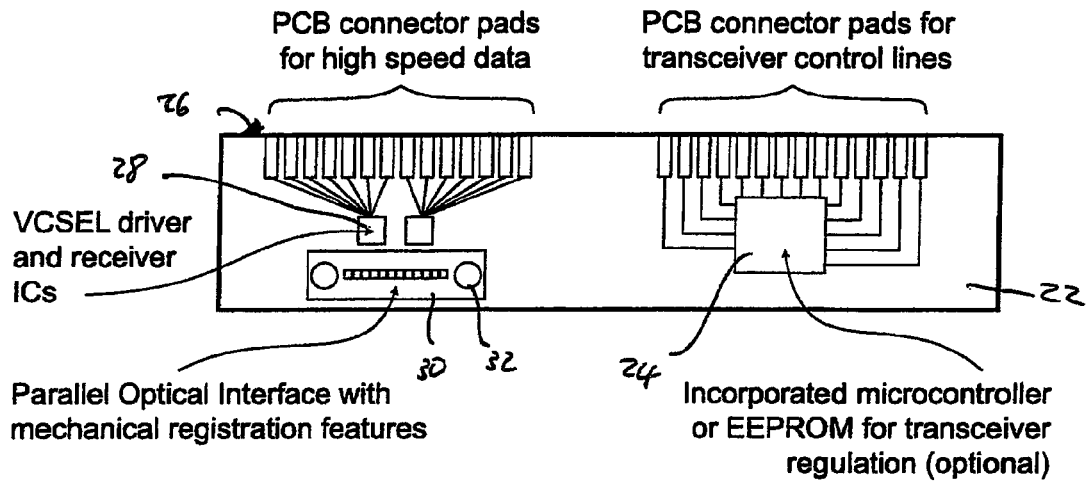
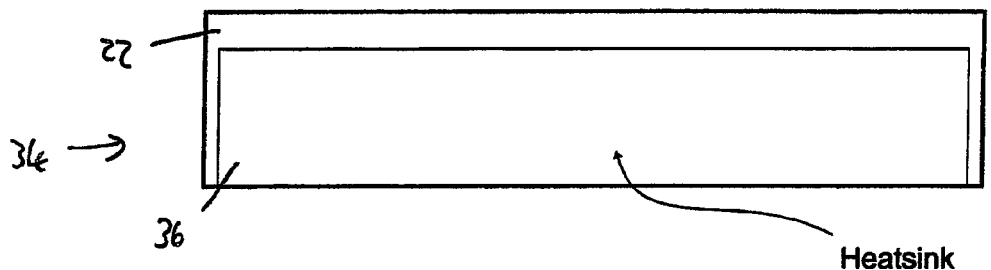
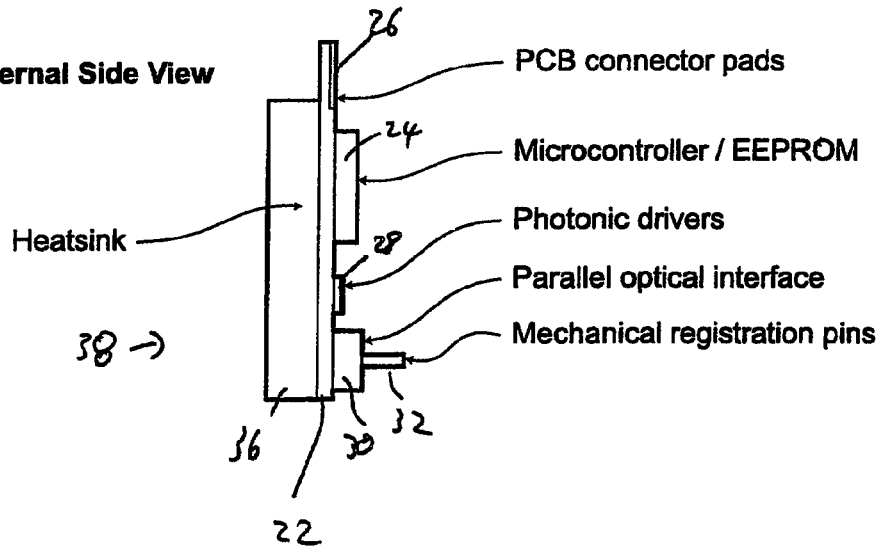
Fig. 3

Internal Front Side
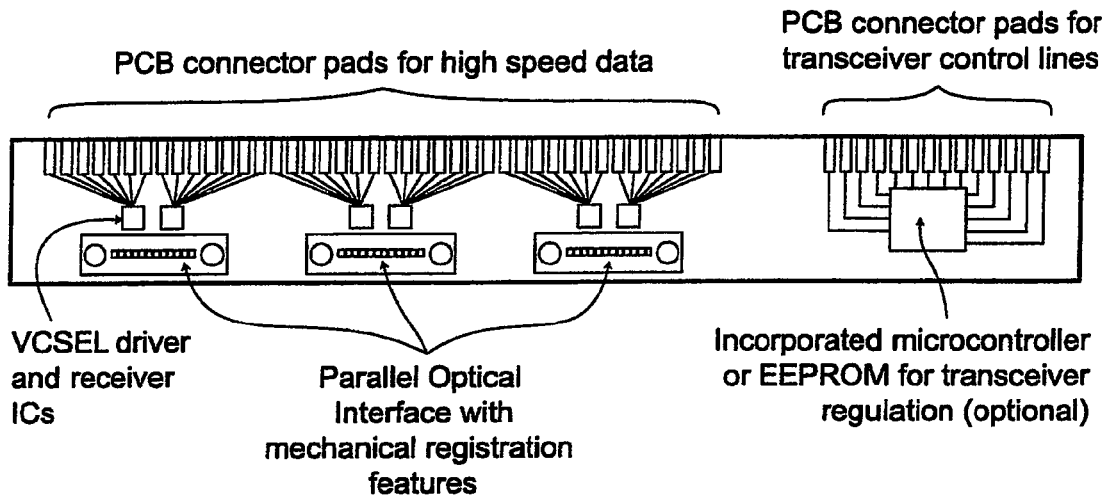
Internal Rear Side
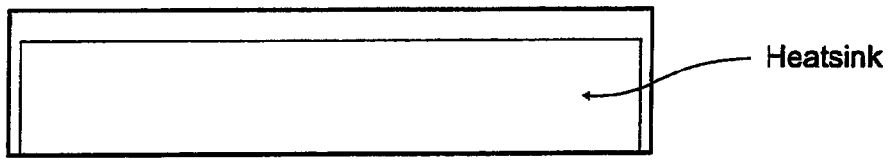
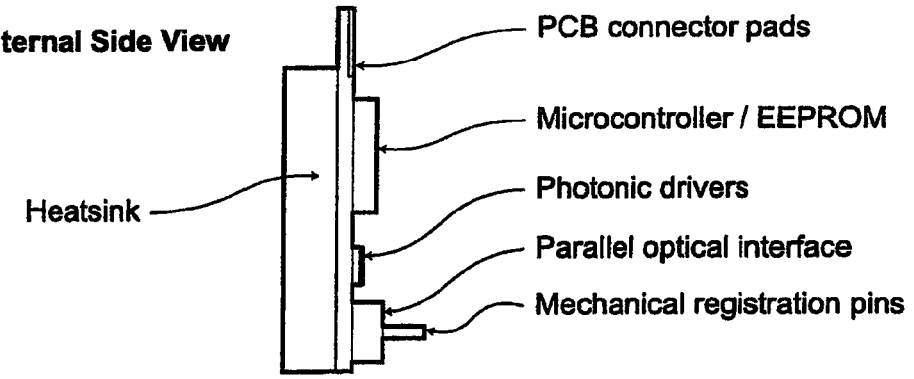
Fig. 4

ADAPTER FOR AN OPTICAL PRINTED CIRCUIT BOARD, AN OPTICAL PRINTED CIRCUIT BOARD AND A METHOD OF CONNECTING AN ADAPTER TO AN OPTICAL PRINTED CIRCUIT BOARD

CROSS REFERENCE TO RELATED APPLICATIONS

This application claims the benefit of priority to provisional application Ser. No. 60/890,346, filed Feb. 16, 2007, the contents of which is incorporated herein in its entirety by reference.

The present invention relates to an adapter for an optical printed circuit board, an optical printed circuit board and a method of connecting an adapter to an optical printed circuit board.

Pluggable optical backplanes are known. An example of such a system is as described in our co-pending patent application number WO-A-2006/129069. In this application, there is disclosed an optical connector for connecting a line card or user circuit, sometimes referred to as a "daughter card", to an optical backplane. The connector comprises an active or passive photonic interface through which optical signals may be transmitted and received between a line card and an optical backplane. Alignment means are provided for ensuring alignment between the optical interface on the connector (attached to the line card) and the optical interface on the backplane with which the line card mates. Such an arrangement provides a very useful and convenient optical transceiver and connector module which supports repeatable docking of conventional line cards (once a connector is arranged thereon) to an optical backplane.

The pluggable optical connector requires a change to the line card to accommodate the proprietary module, which also consumes a significant amount of "real estate", i.e. surface area, on the line card. In addition, there is a tight limit to the number of channels which can be accommodated in one of the proprietary modules, which increases the per port cost significantly as separate modules are required to accommodate multiples of up to twelve channels each.

Thus, a significant challenge is posed to the need to bring the cost of high speed optical interconnects into parity with high speed copper interconnects, generally considered a key precondition to the proliferation of optical PCB connector technology. The low port number per module also means that far more space is consumed on the backplane interface side of the line-card than would be consumed by the equivalent electrical connector.

As the daughter card is repeatedly plugged and unplugged from the backplane, the optical connection between the daughter card and backplane is repeatedly broken and re-made. This can lead to problems such as contamination issues as dirt and dust can be introduced during the mate and de-mate cycles of the connector. Thus, the coupling efficiency of the optical connection worsens significantly with repeated use. This is clearly undesirable.

One method by which this can be addressed is disclosed in U.S. Pat. No. 6,588,943. In this document, there is disclosed an electro-optical connector that provides a separate electrical interface for connecting to a circuit board. The optical connection between the fibre and the connector are "semi-permanent". In fact, as the document teaches the semi-permanent connection between the optical fibre and the electro-optical module is provided in a controlled factory setting which enables better alignment in a dust free environment. However, there is a clear problem with such a system. The semi-permanent nature of the connector module means that if the module malfunctions and needs replacing then the job of replacing it is very complex. Indeed, it would seem from the teaching of the document that it is necessary to return it to the manufacturer so that the semi-permanent optical connection can be re-made within the controlled factory setting.

According to the present invention, there is provided an adapter for an optical printed circuit board, the adapter comprising a socket for receiving a daughter card for connecting to the optical printed circuit board and a connector for engagement with an optical printed circuit board and being arranged such that when the connector engages with an optical printed circuit board, an optical connection is established between the optical printed circuit board and the adapter.

According to a further aspect of the present invention, there is provided an adapter for an optical printed circuit board, the adapter comprising a connector for engagement with a corresponding connector on the optical printed circuit board, such that when engaged the adapter enables electrical and optical communication between the optical printed circuit board and the adapter, the adapter being pluggably detachable from the optical printed circuit board.

In embodiments of the present invention, an optical backplane and an adapter module are provided such that the interface between the daughter card and the backplane is essentially the same as for a conventional purely electrical daughter card/backplane interface. In other words, the daughter cards such as hard disk drives, will "see" exactly the same interface that they would see were the backplane an entirely conventional copper backplane. However, the adapter module serves to convert electric signals received from the daughter cards into optical signals for optical transmission through optical channels such as embedded waveguides, along the backplane. The converse is also true, i.e. the adapter receives optical signals transmitted along the optical channels on the backplane and converts them to electric signals which are relayed to the daughter card. Thus, the benefits of the use of an optical backplane are achieved without the drawbacks of the optical connections described above.

In contrast to the arrangement provided in U.S. Pat. No. 6,588,943, the adapter of embodiments of the present invention is such that it is detachable in a simple and straightforward manner from the optical printed circuit board. Thus, an optical connection is fixed when the adapter is provided on the optical printed circuit board but is easily broken when required to enable simple removal of the adapter from the optical printed circuit board. Thus, it is not necessary to return the printed circuit board to the manufacturer or indeed even to dispose of the optical printed circuit board if faults should ever develop in the adapter.

In addition, since the adapter is able to receive a conventional electric connector from a daughter card, the plugging of a daughter card into communication with the optical printed circuit board does not require the making and breaking of an optical connection so that contamination is kept to a minimum. Thus, the problems in this respect are addressed whilst not generating the problems of disposability referred to above inherent in U.S. Pat. No. 6,588,943.

Preferably, the adapter comprises an optical interface for engagement with a corresponding optical interface on an optical signal carrier on the optical printed circuit board on which, in use, the adapter is arranged.

Preferably, the adapter comprises an actuator, upon actuation of which the optical connection may be established or broken. The actuator may also be such as upon actuation thereof it enables an adapter to be plugged into or out of an optical printed circuit board. Thus, in some embodiments the act of engagement with the actuator is required to enable the adapter to be plugged into or out of the optical printed circuit board.

Preferably, the adapter comprises a transceiver module for receiving electrical signals and converting these to optical signals and vice versa.

Preferably, the adapter comprises electrical contacts for providing a passage for electrical signals from the adapter to an optical PCB on which it is, in use, arranged. In one preferred example, the electrical contacts are arranged to have a pluggable interaction with corresponding contacts on an optical PCB on which, in use, the adapter is arranged.

Preferably, the adapter is a bidirectional adapter enabling connection to waveguides extending in at least two different directions on the optical PCB on which, in use, the adapter is arranged. Thus, the footprint required to enable optical communication between adjacent daughter cards on opposite sides of a subject daughter card is significantly reduced. Whereas conventionally a large area would have been required to enable the curvature of the light signal carriers to be kept within acceptable limits taking into account optical signal loss etc, in the present case this issue is addressed by the provision of bidirectionality.

Preferably, the transceiver module comprises two or more legs, each for supporting one or more optical interfaces.

Preferably, one or more components for biassing the legs apart from or towards each other is provided. The component could be any suitable component, with one example being a spring.

According to a second aspect of the present invention, there is provided an assembly, comprising: an optical printed circuit board having one or more optical signal carriers for the passage of optical signals therethrough and electrical paths for the passage of electrical signals; and, an adapter according to the first aspect of the present invention.

According to a third aspect of the present invention, there is provided a method of assembling an optical printed circuit board assembly, the method comprising: providing an optical printed circuit board; providing an adapter according to the first aspect of the present invention; and, connecting said adapter to the optical printed circuit board to establish optical connection between the adapter and the optical printed circuit.

Examples of the present invention will now be described in detail with reference to the accompanying drawings, in which:

FIG. 3 shows an example of an electro-optical converter for arrangement within the adapter of FIG. 2. Various views are shown;

FIG. 4 shows a further example of an electro-optical converter for use in the adapter of FIG. 2;

Figure 13:
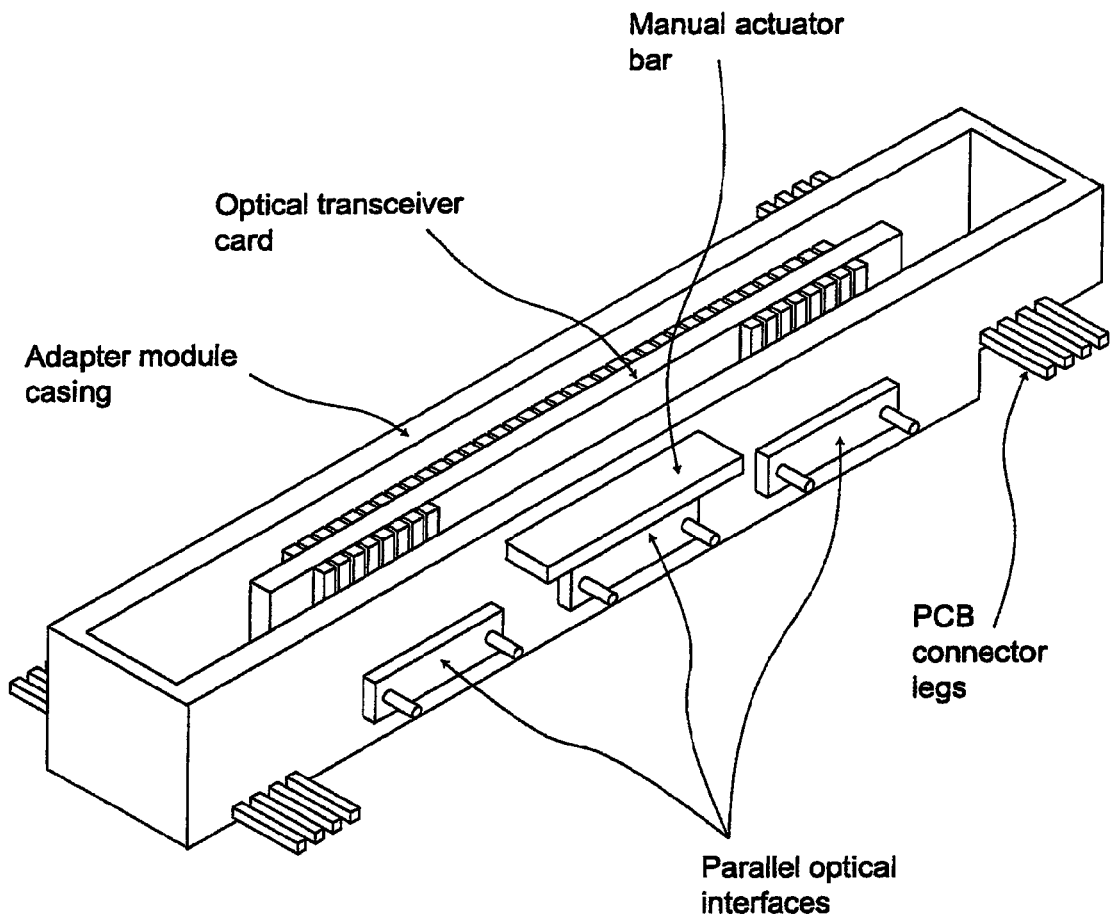
Figure 19:
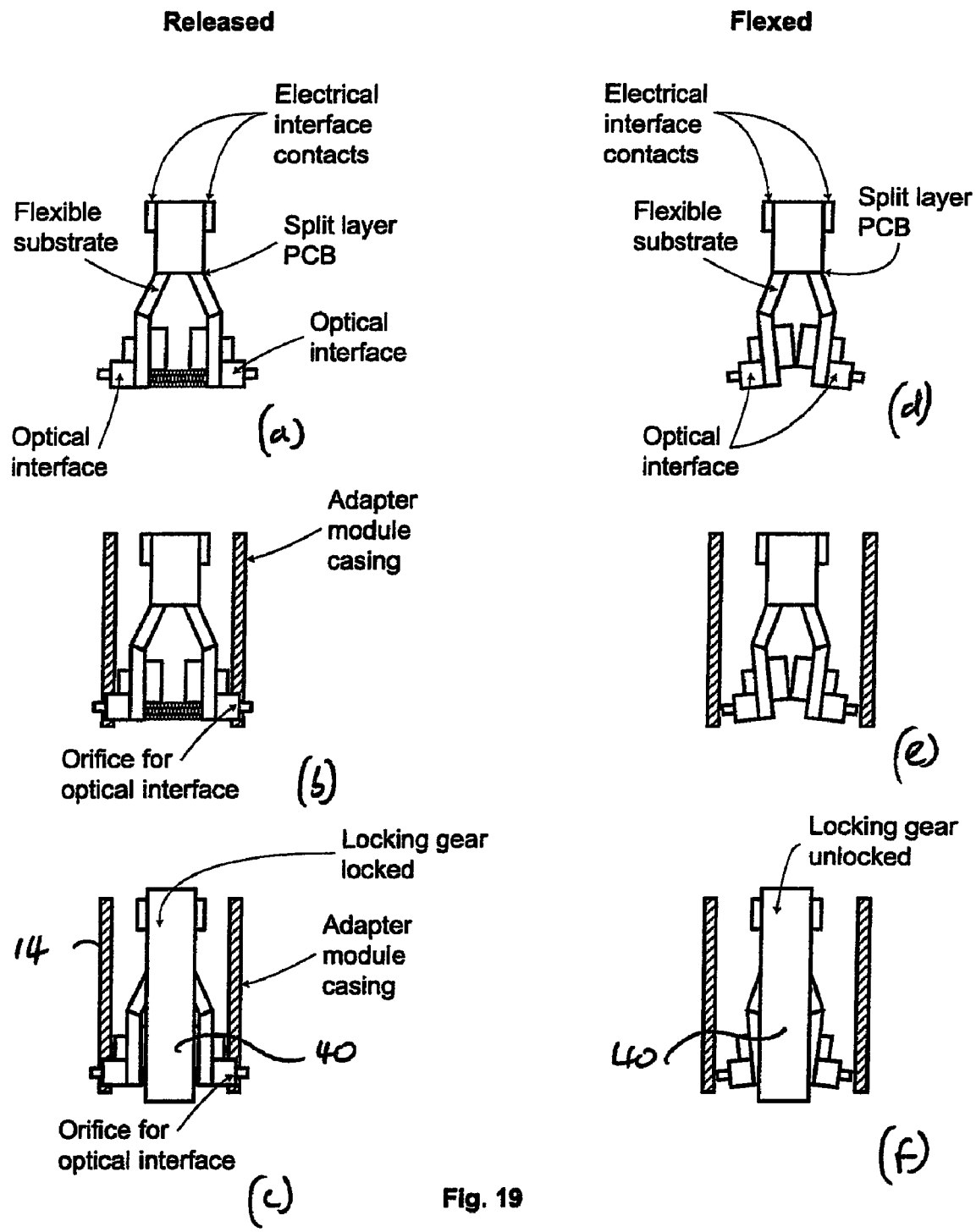
Figure 20:
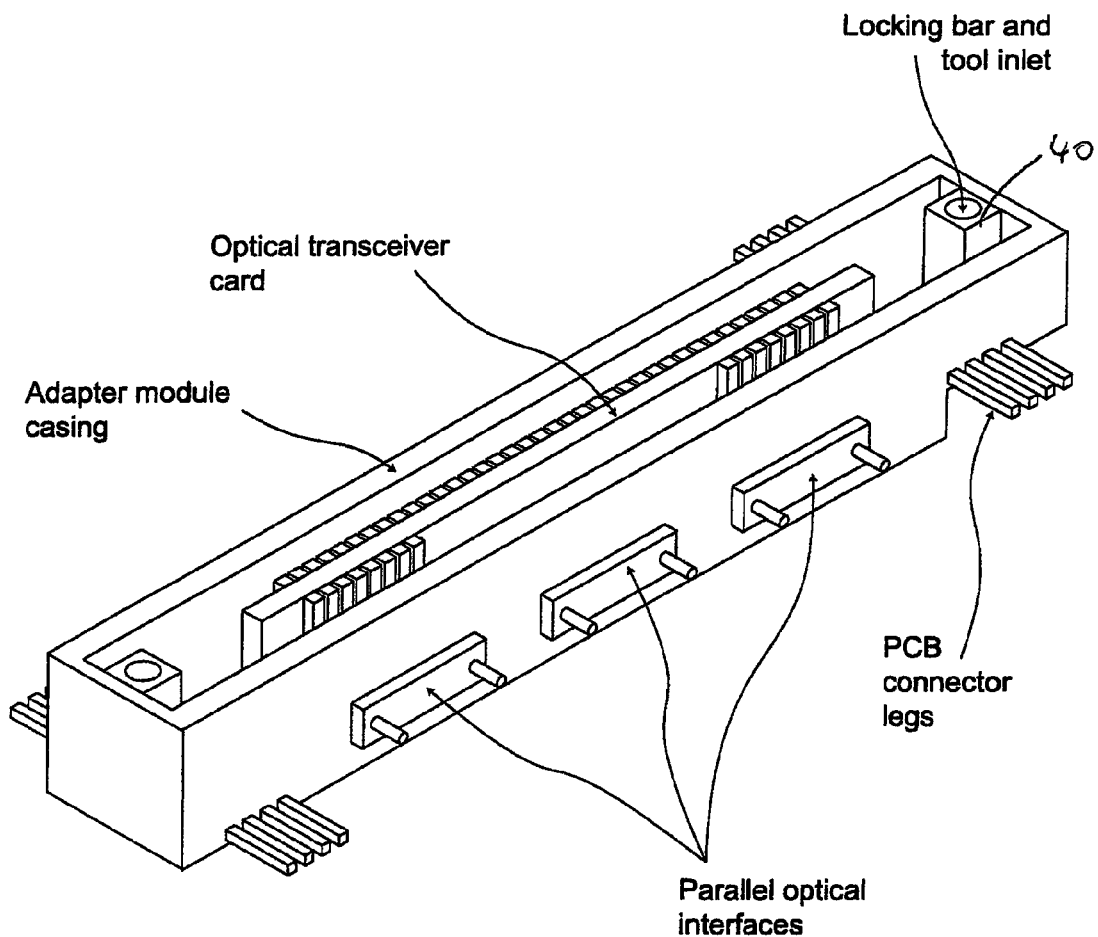
Figure 21:
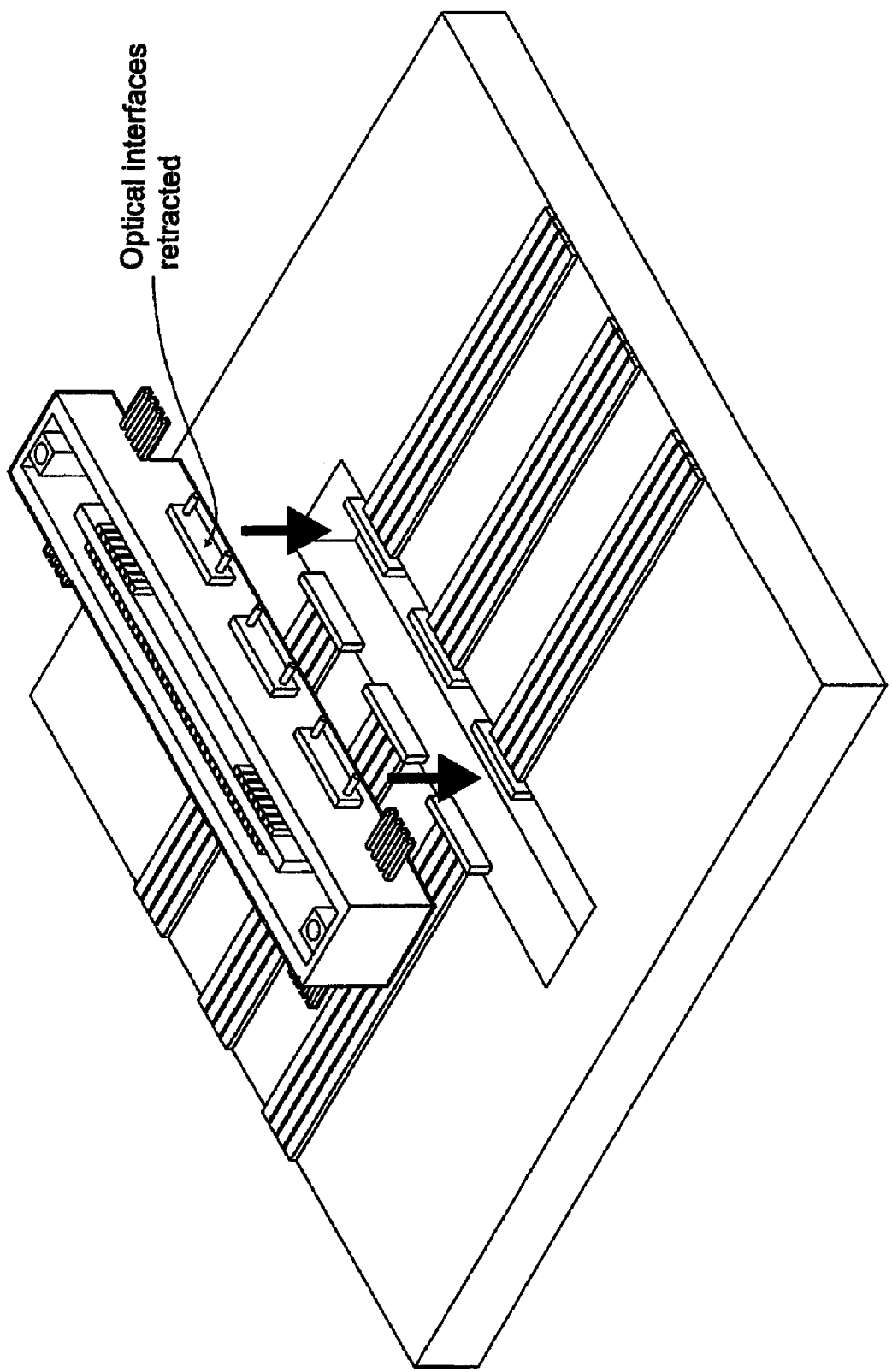
Figure 22:
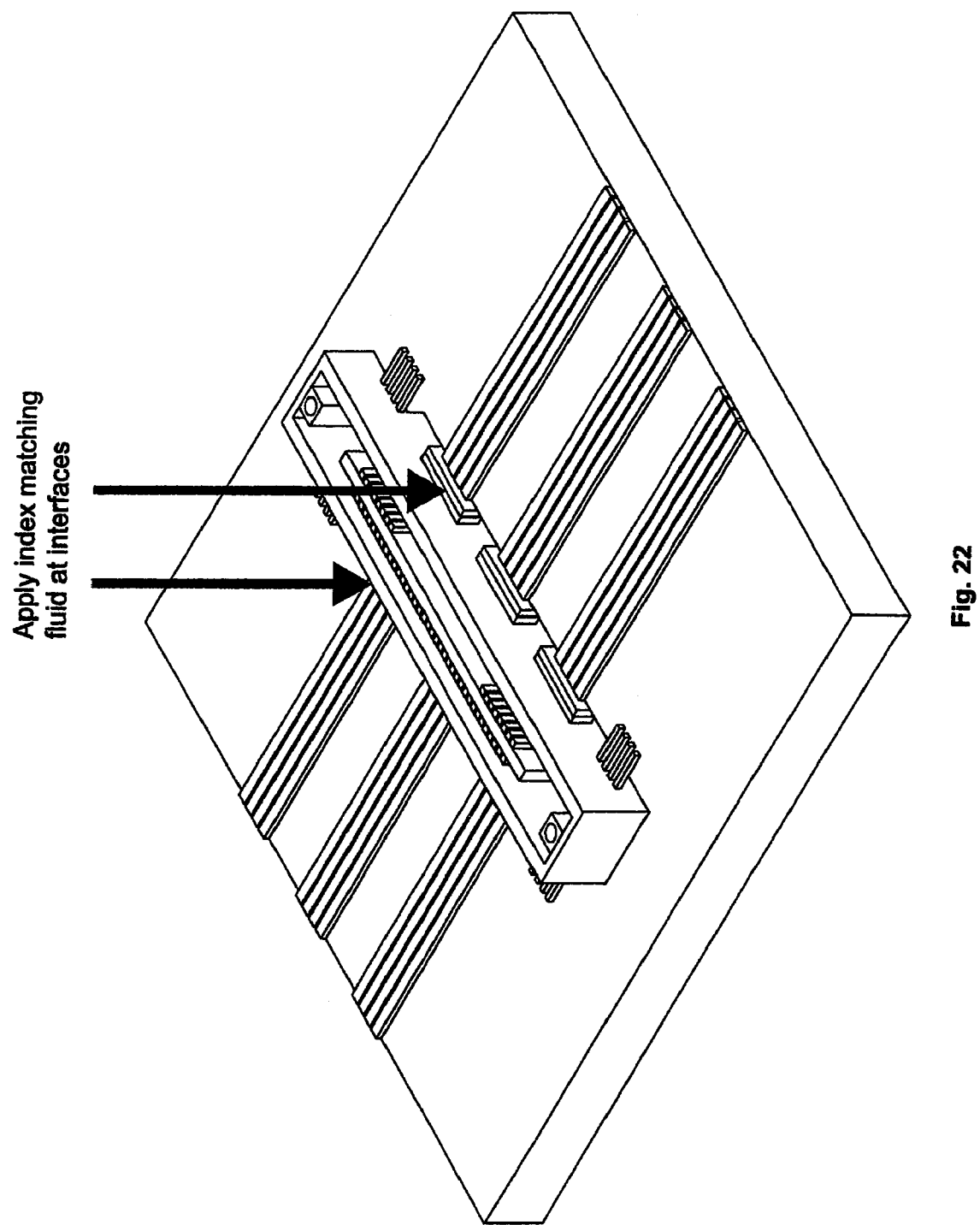
Figure 25:
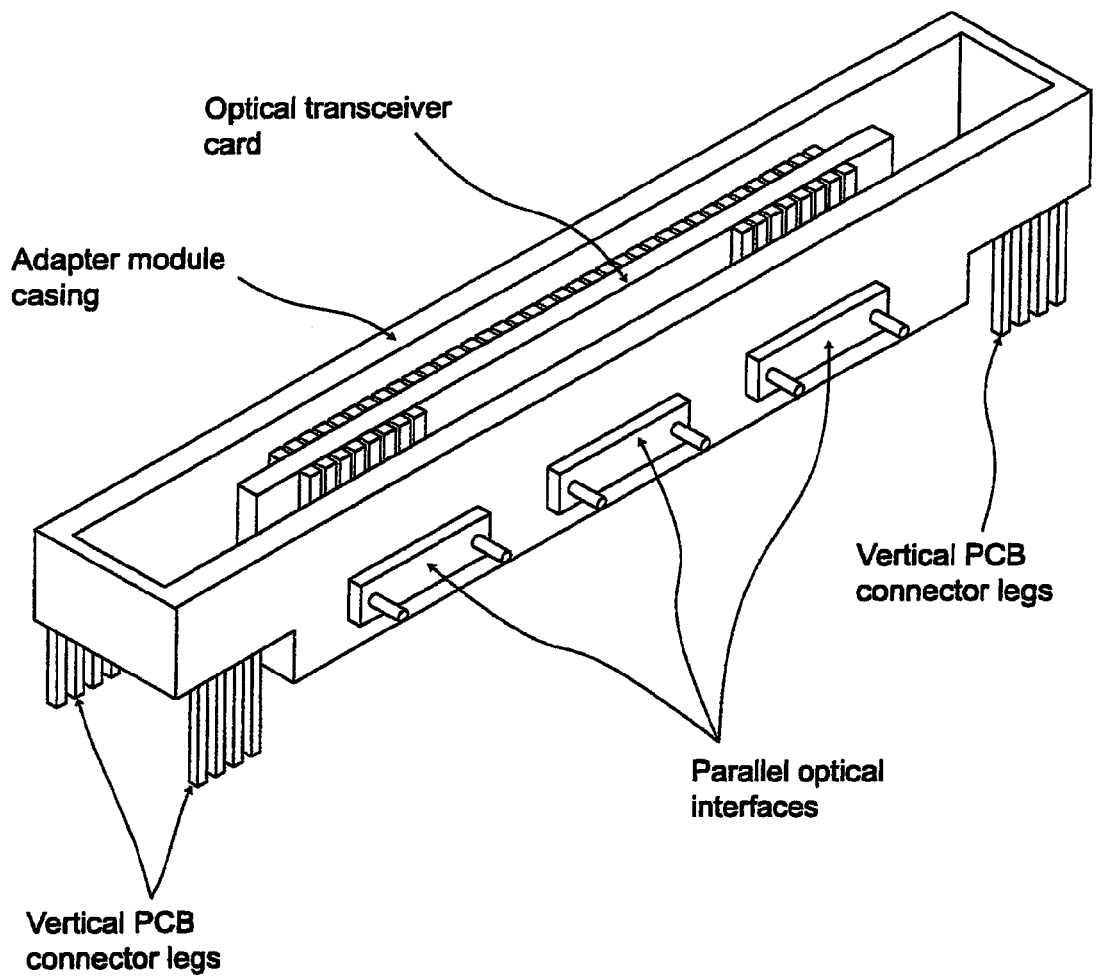
Figure 26:
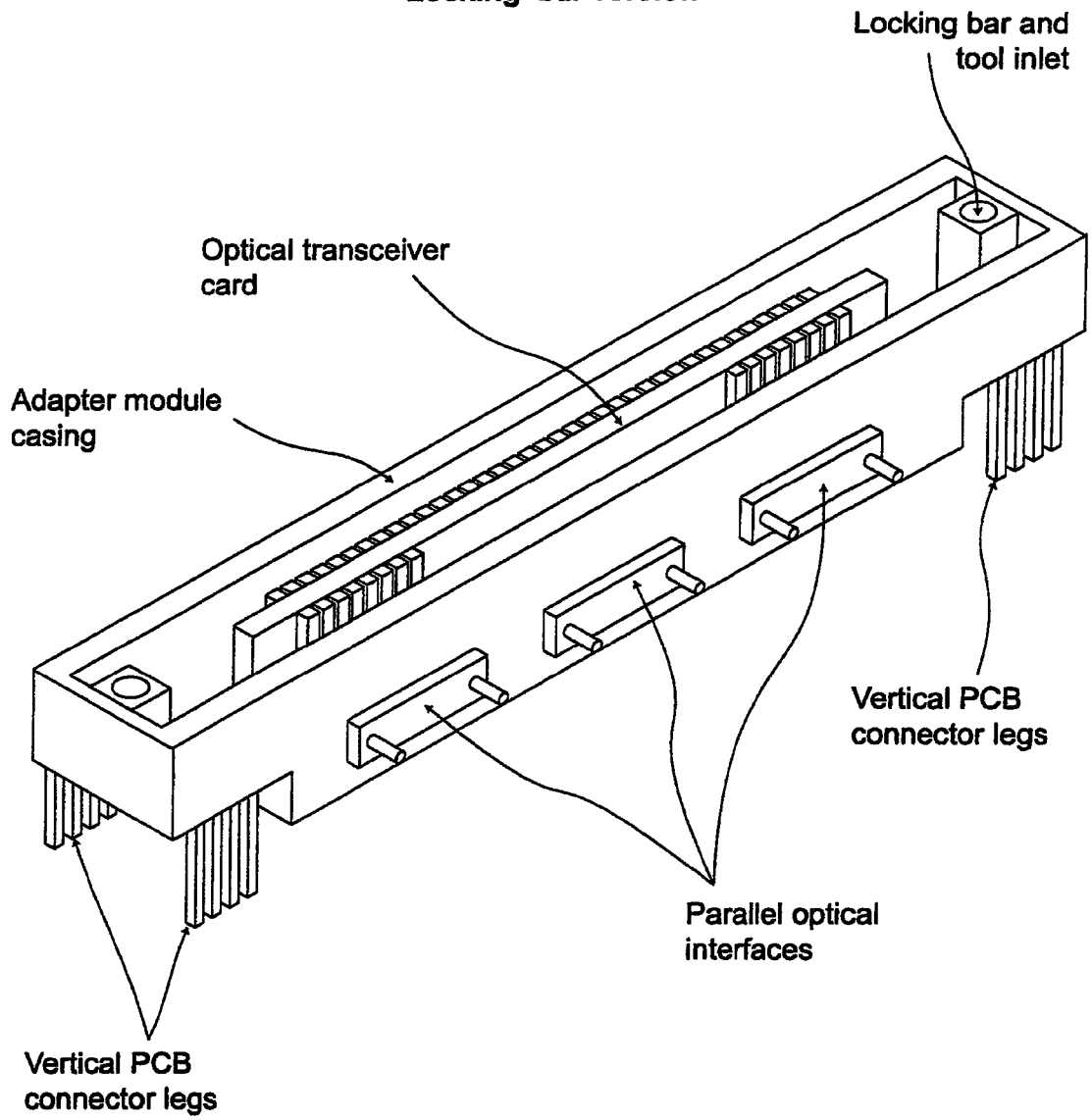
Figure 27:
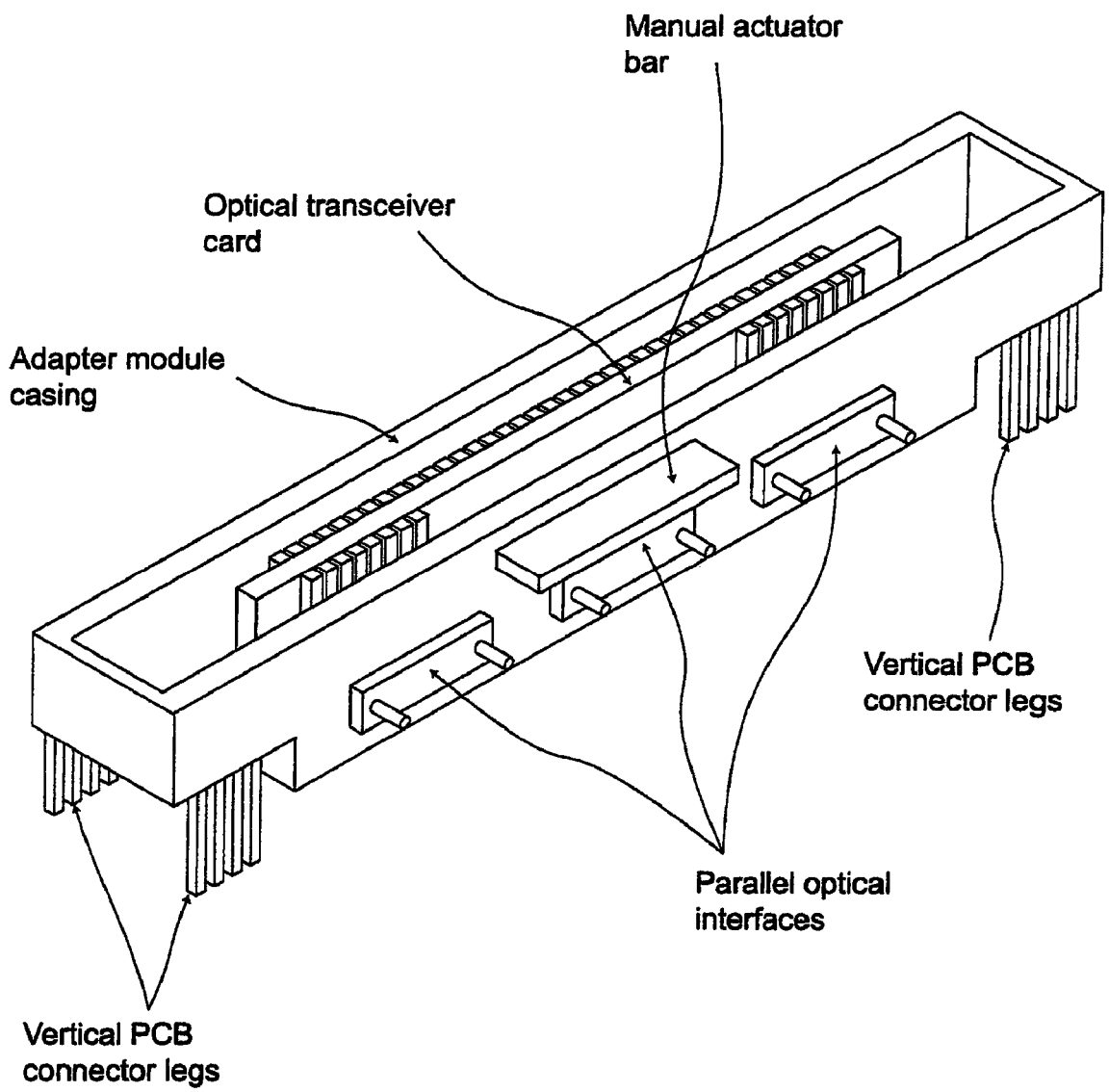
Figure 28:
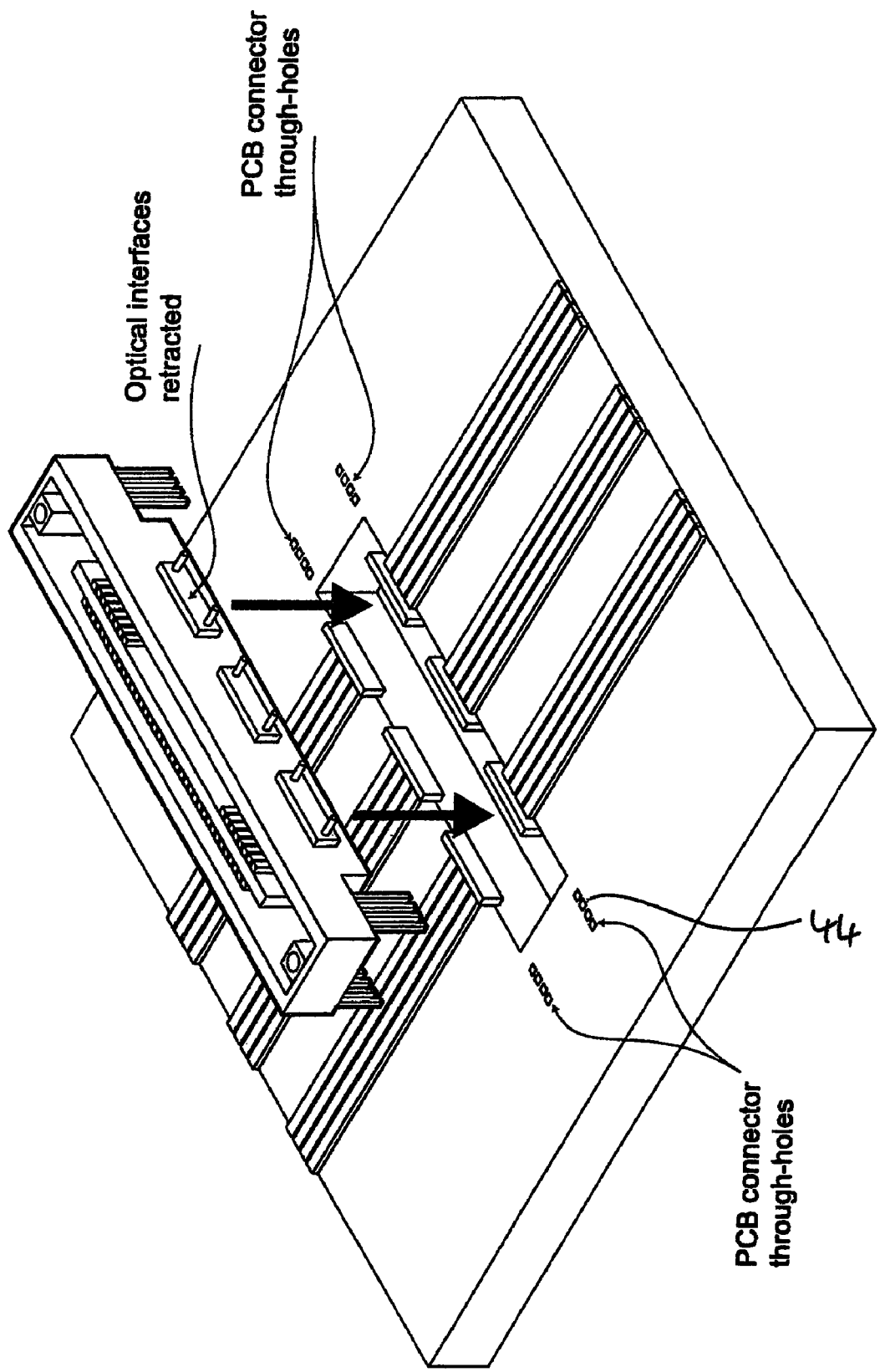
Figure 29:
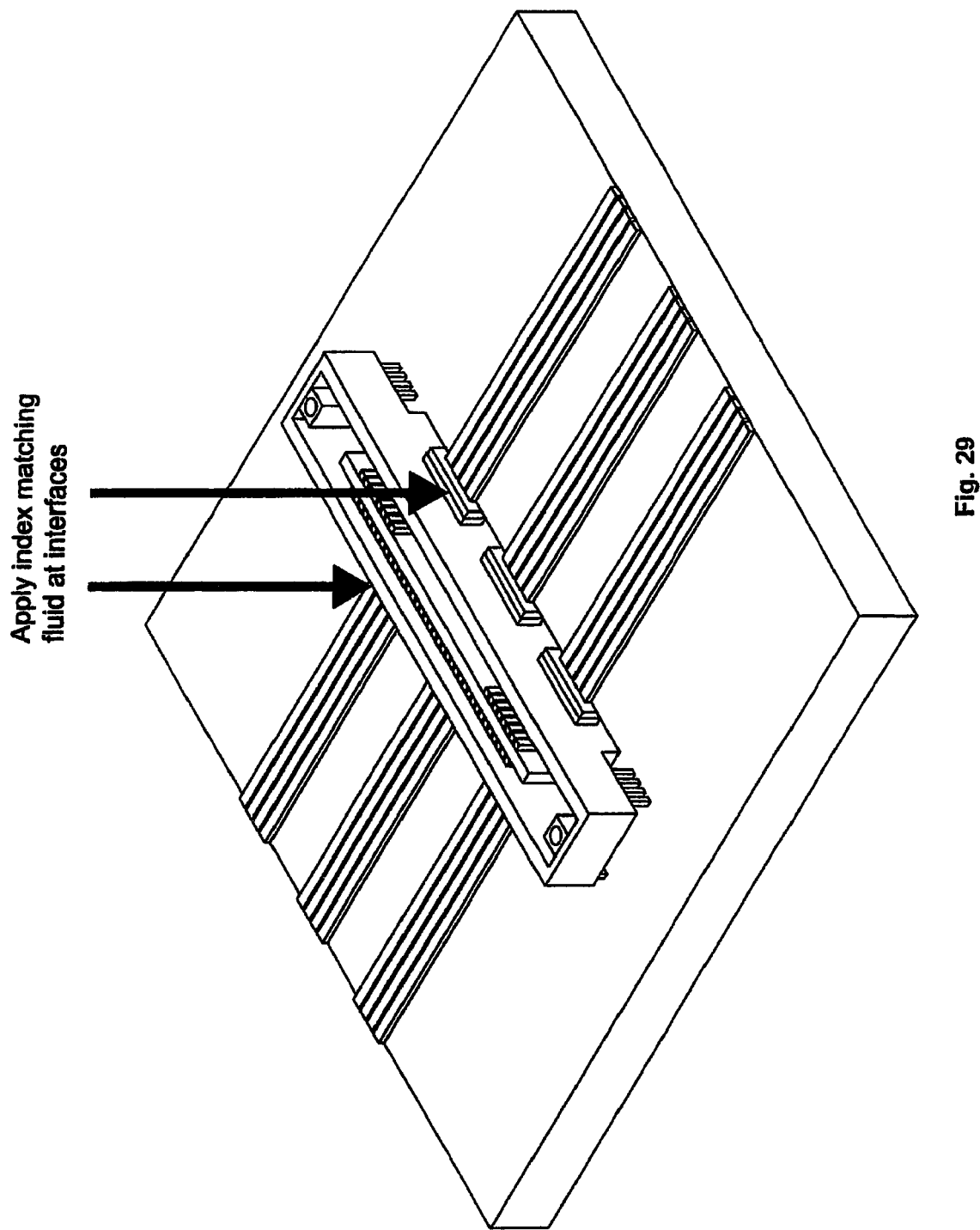
Figure 30:
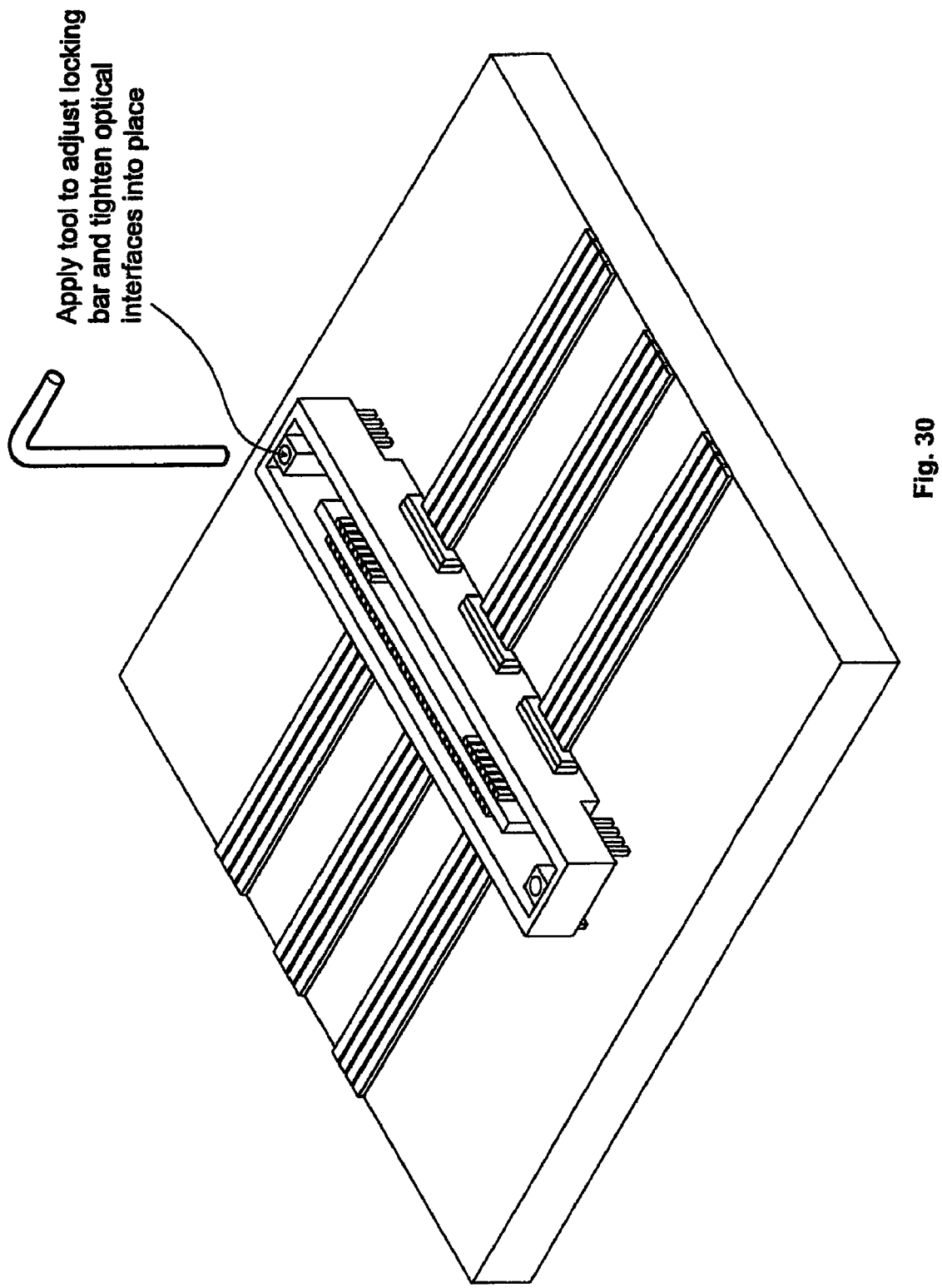

FIGS. 12(a) to 12(f) show an example of a bidirectional optical adapter module in various released and flexed states;

FIG. 13 shows a bidirectional optical adapter module with an actuator bar;

FIGS. 14 to 18 shows various stages in the assembly of an optical printed circuit board with an optical adapter such as that shown in FIG. 13;

FIGS. 19(a) to 19(f) show an example of a bidirectional optical adapter module in various released and flexed states FIG. 20 shows an example of an optical adapter including a locking mechanism;

FIGS. 21 to 24 show stages in the assembly of an optical printed circuit board with an optical adapter such as that shown in section in FIG. 20;

FIG. 25 shows a bidirectional optical adapter module with vertical electrical contact legs;

FIG. 26 shows a bidirectional optical adapter module with vertical electrical contact legs including a locking bar;

FIG. 27 shows a bidirectional optical adapter module with vertical electrical contact legs including an actuator bar;

FIGS. 28 to 30 show stages in the assembly of an optical printed circuit board with an optical adapter such as that shown in FIG. 27.

Figure 1:
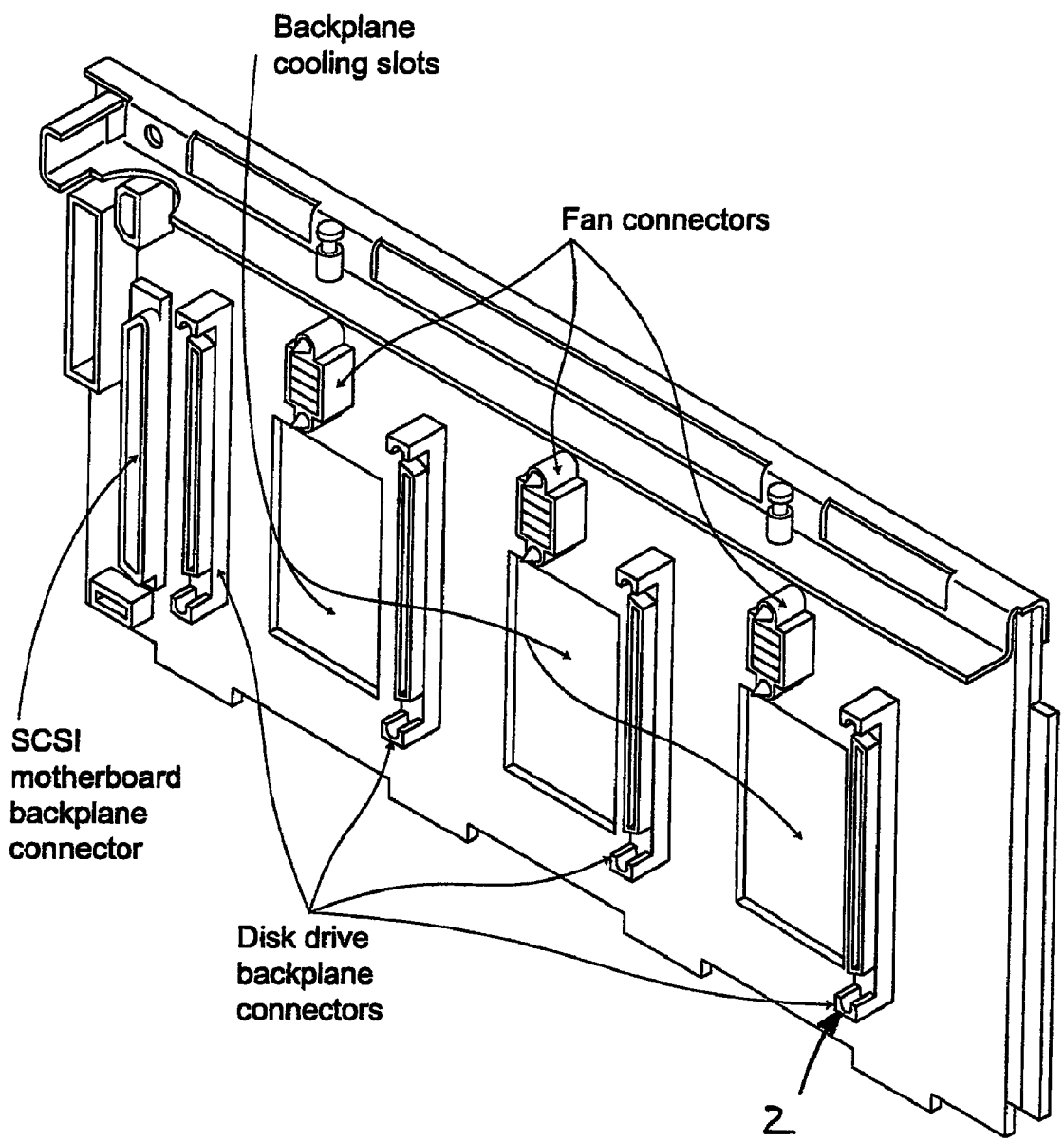
FIG. 1 shows a conventional backplane having plural connectors each for receiving a disk drive or other such daughter card.

FIG. 1 shows a conventional backplane having plural connectors 2 each for receiving a disk drive or other such daughter card. As will be explained below, in embodiments of the present invention, an optical backplane and an adapter module are provided such that the interface between the daughter card and the backplane is essentially the same as currently provided on conventional electric backplanes.

In other words, the daughter cards such as hard disk drives, will see exactly the same interface that they would see were the backplane an entirely conventional copper backplane. However, the adapter module serves to convert electric signals received from the daughter cards into optical signals for optical transmission through optical channels such as embedded waveguides along the backplane. Thus, the benefits of the use of an optical backplane are achieved without the drawbacks of optical connections described above.

Figure 2:
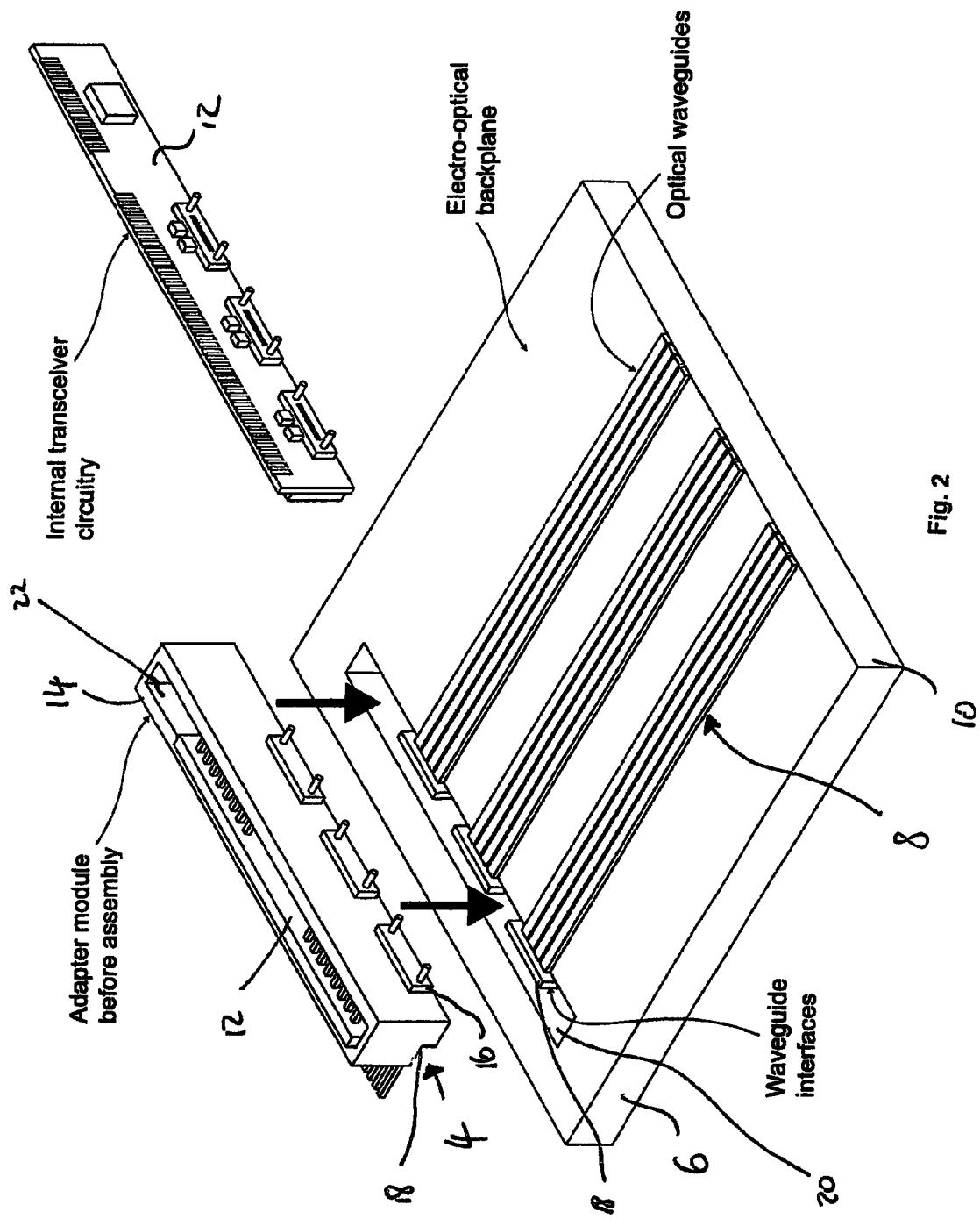
FIG. 2 shows a schematic representation of an adapter module and an optical backplane.

FIG. 2 shows a schematic representation of an adapter module 4 and an optical backplane 6. As described herein the term "optical backplane" is used to refer to a backplane which has optical channels or optical signal carriers e.g. provided by embedded waveguides or optical fibres, thereon or therein for the communication of optical signals between components and/or different line cards. It is not meant to imply that communication along the backplane is exclusively optical and there will of course typically be included various metal layers and paths within the optical backplane to enable electrical communication along the backplane if required or desired.

In the example shown, the optical backplane 6 includes plural optical waveguides 8 for the passage of optical signals along the backplane. The backplane is shown for clarity with a cleaved surface 10. Clearly, the complete backplane may include some connectors or adapters on the cleaved surfaces of the optical waveguides 8.

An adapter module 4 is provided. The adapter module 4 includes a transceiver module 12 which is also shown drawn outside the housing of the assembly. The adapter module includes a housing 14 within which the transceiver module 12 is arranged. The transceiver module includes circuitry necessary for the function of the adapter, as will be explained in greater detail below. Connectors 16 are provided for engagement with corresponding connectors 18 at the optical interface between the waveguides 8 and the adapter module 14. As will be explained below, these may be of a conventional form of optical interface such as those relating to the MT standard of parallel optical interconnect. The connectors typically include one or more optical interface(s) and also some means to ensure physical alignment of the optical interface(s) with a corresponding interface provided at the waveguide(s) with which the adapter interface will, in use, mate.

The housing of the adapter module 14 is shaped with a step 18, in this example, so as to enable easy engagement with an opening 20 formed within the optical backplane. The adapter module 4 provides a socket 22 into which a conventional daughter card may be inserted. The electrical connection interface may therefore be of any suitable type such as PCI. The transceiver circuitry 12 functions to receive electrical signals from the daughter card and to convert the electrical signals into optical signals for coupling into the waveguides 8 via the waveguide interfaces 18. The communication is of course bidirectional and the transceiver circuitry 12 also functions to receive optical signals from the optical waveguides 8 and convert these into electrical signals for onward transmission through or to a connected daughter card.

The adapter module 4 is arranged such that upon engagement with the optical printed circuit board 6, the optical connection between the waveguides 8 and the optical interface that may form part of the connector 16 provided within the adapter module 4, is automatically formed. Therefore, there is no complex engagement procedure required to establish optical connection between the adapter module and the optical printed circuit board. There is no requirement that the adapter module be engaged with the backplane in a clean room environment or a factory setting. Rather, the adapter module 4 is entirely detachable from the optical backplane and may be attached or detached from the backplane within a user's home environment. Thus, the adapter module provides an extremely useful and convenient means by which an optical backplane can be used for communicating signals between conventional electrical daughter cards such as hard disk drives or indeed any such user circuit.

With some known optical backplanes, each time a user circuit is engaged with or detached from the optical backplane the optical connection must be made or re-made, respectively. In the present case, once the adapter module is engaged with the optical backplane the optical connection between the waveguides on the backplane and the interface on the adapter is fixed, but not in a permanent irreversible manner. Rather, the establishment of optical communication is easily and conveniently reversible. Thus, the adapter is easily detachable should a fault develop with the adapter such that the adapter can be changed by a user in a simple and straightforward manner without requiring return of the backplane and faulty adapter to the producer or manufacturer. Therefore, the problems of known systems described above are conveniently and simply addressed.

FIG. 3 shows a number of views of the transceiver module including circuitry 12, as shown in FIG. 2. In the example shown in FIG. 3, only a single parallel optical interface is shown whereas in the example shown in FIG. 2 three such interfaces are shown. However, the relationship between the two examples shown is clear.

Referring to FIG. 3, the transceiver module 12 includes a PCB substrate 22 having arranged thereon a micro controller or EEPROM for transceiver regulation. Any suitable controller could be used. The PCB also is provided with electrical connector pads 26 for high speed data connection with a user circuit when connected to the adapter. In this particular example, the PCB connector pads are arranged in electrical communication with a vertical cavity surface emitting laser (VCSEL) driver, VCSEL (either one or an array), receiver integrated circuits and photodiode (either one or an array) 28. These are arranged to receive electrical signals from a user circuit when connected in the adapter and to convert these to optical signals for transmission along the waveguides on the optical backplane and vice versa.

A parallel optical interface 30 is provided having registration features 32. The parallel optical interface 30 is sized and arranged such that upon attachment of the adapter to an optical backplane the optical interface is automatically aligned with a corresponding optical interface on the end of the waveguides. The parallel optical interface will typically comprise one of more lasers (e.g. VCSEL), one or more photodiodes and one or more lenses.

FIG. 3 also shows a reverse view 34 of the transceiver circuitry. On the reverse side of the PCB 22, a heat sink 36 is provided. A cross section 38 of the transceiver circuitry 12 is shown. The various components described above can be seen and will not now be described further.

FIG. 4 shows a further example of the internal transceiver circuitry for use in a unidirectional adapter described above with reference to FIG. 1. In the example of FIG. 4, three parallel optical interfaces are provided. In all other respects, the circuitry in FIG. 4 corresponds to that of FIG. 3 and no further description will therefore be provided. However, it is to be noted that the provision of transceiver circuitry in this manner enables the number of channels which can be accommodated in an adapter to be easily controlled or varied. As mentioned above, the cost of high speed optical interconnects is generally considered a key pre-condition to the proliferation of optical printed circuit board connector technology. The arrangement of plural parallel optical interfaces addresses this in a useful and convenient manner.

Figure 5:
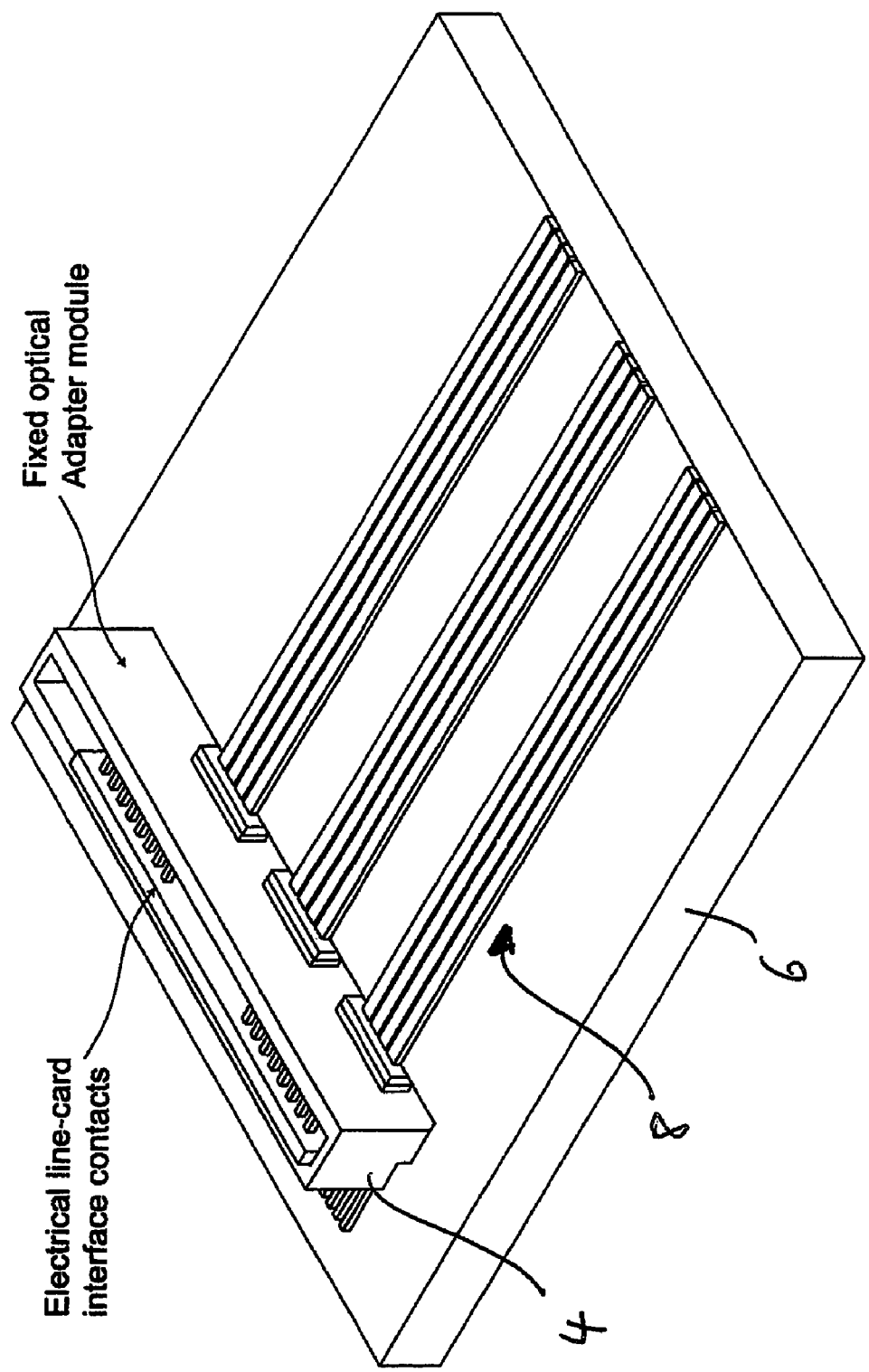
FIG. 5 shows an assembled arrangement of an adapter and an optical backplane.

FIG. 5 shows the optical adapter module 4 of FIG. 2 plugged into an optical backplane 6. It can be seen that the mere plugging in of the adapter module 4 will serve to establish optical connection between the adapter module and the optical waveguides 8 provided on the backplane 6. It is important to understand that the connection between the optical interface on the adapter module and the optical interface 18 on the waveguides is not necessarily fixed in any permanent sense. Rather, an index-matching fluid is provided by an assembler e.g. a human operator, together with an appropriate cleaning fluid in the general areas on the interfaces that will interact.

Then, once the optical interfaces are locked into position and the electrical adapter PCB contacts have been connected to the PCB, the optical connection will remain properly aligned and will be impervious to contamination. The optical interfaces will also remain completely impervious to the displacements between line cards and the backplane which are inherent to any real system affected by air flow, thermal, mechanical, and acoustic deformation.

Figure 6:
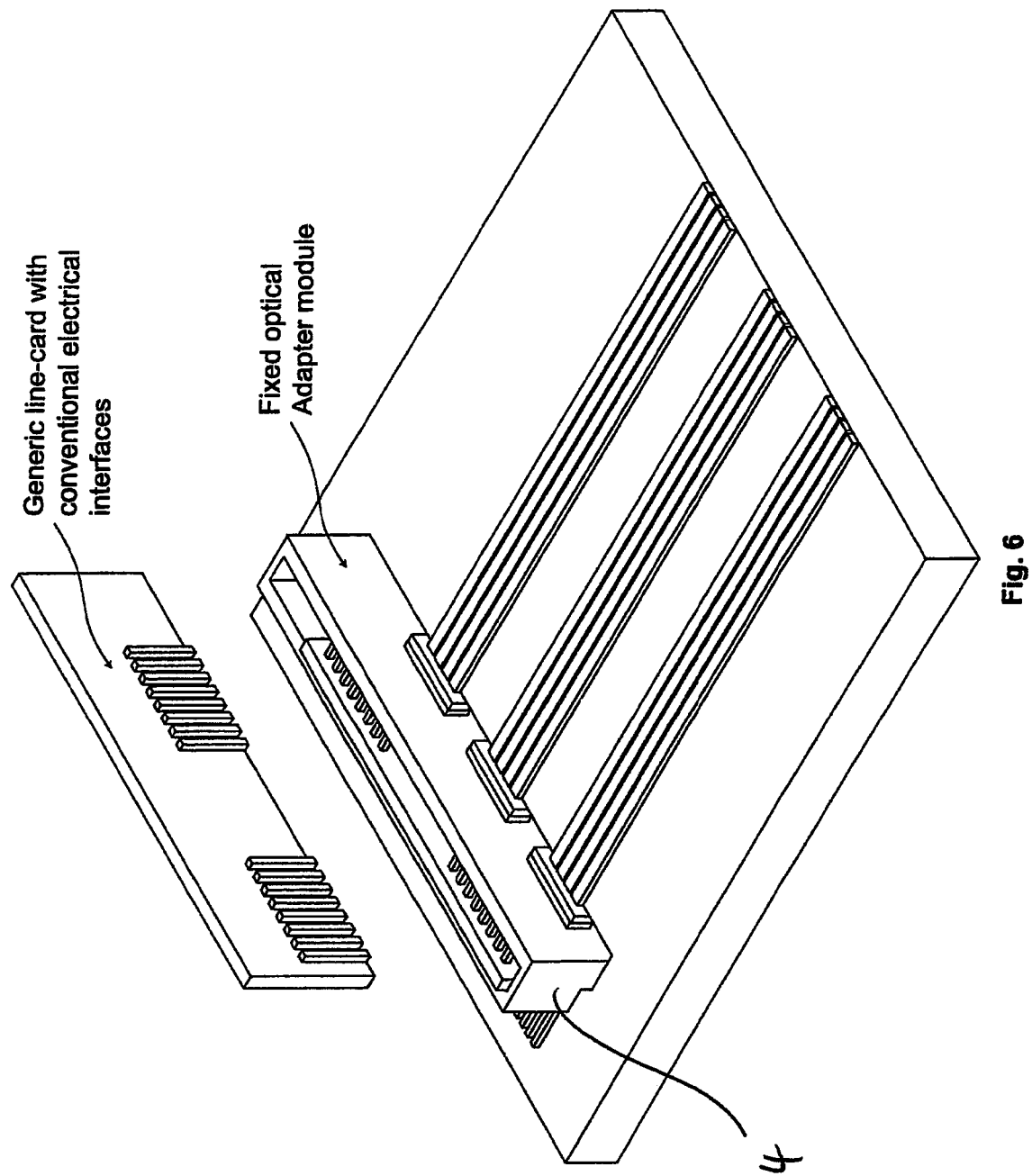
FIG. 6 shows the arrangement of FIG. 5 together with the conventional electrical interface of a daughter card.

FIG. 6 shows an arrangement of FIG. 5 together with a conventional electrical interface of a daughter card. It can be seen that the connection between the daughter card and the adapter module 4 is the same as the connection between a generic line-card with conventional electrical interfaces and a known electrical backplane. Thus, no modification is required to the line-card to enable it to be used with the adapter module and optical backplane described herein. The benefits of the use of an optical backplane are however obtained.

Figure 7:
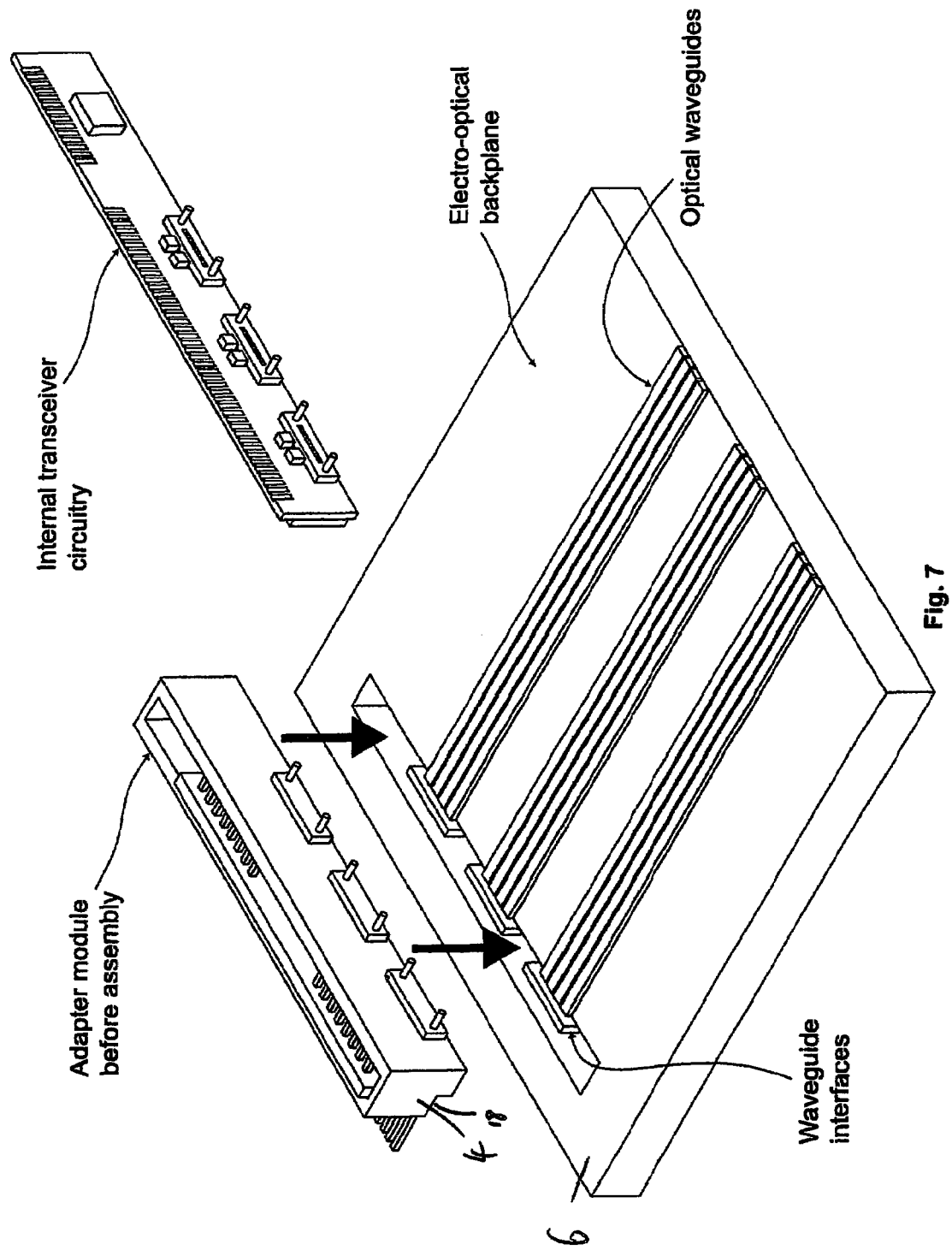
FIGS. 7 to 11 show steps in the assembly of an optical backplane with a unidirectional adapter module.
Figure 8:
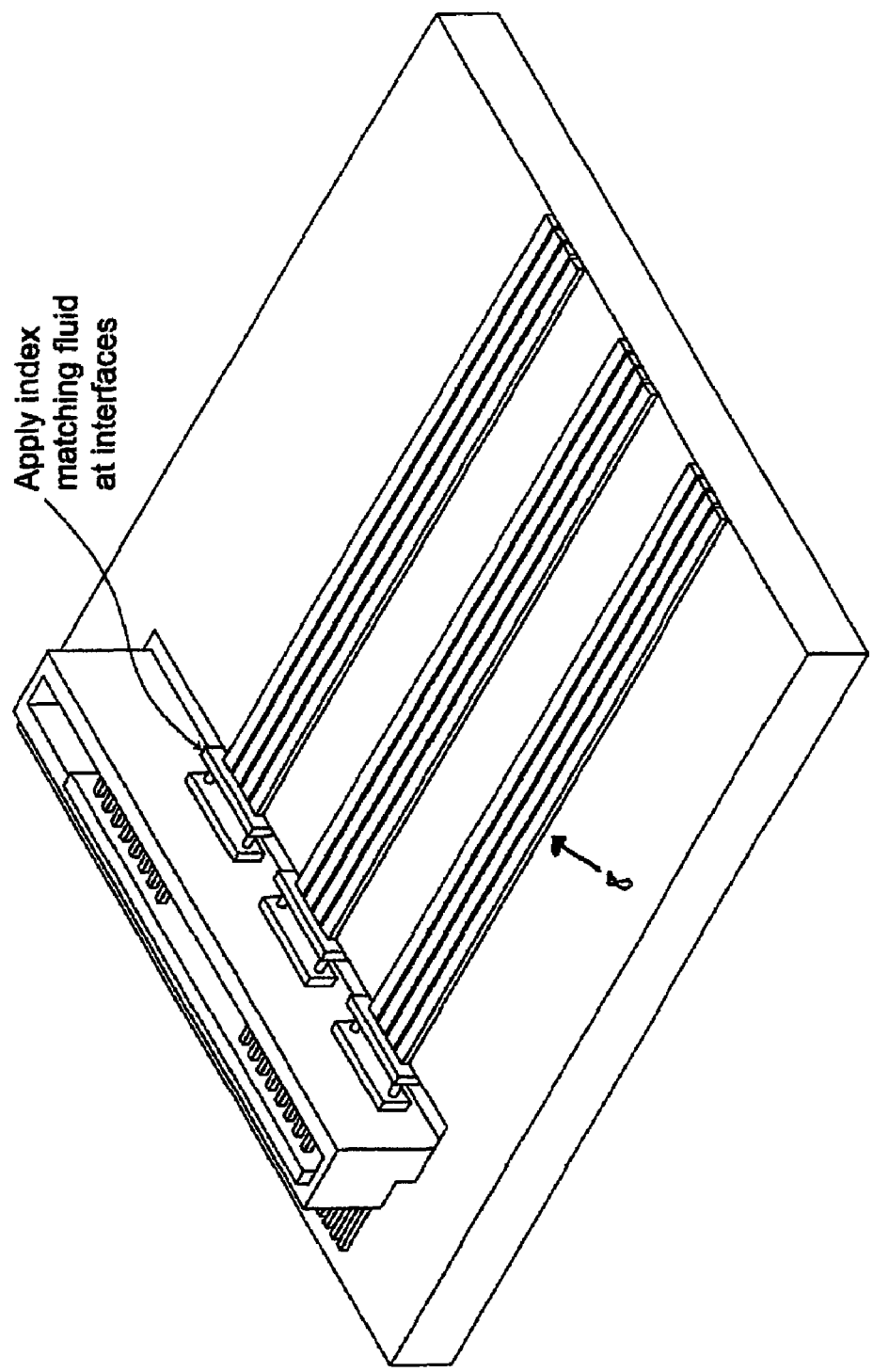
Figure 9:
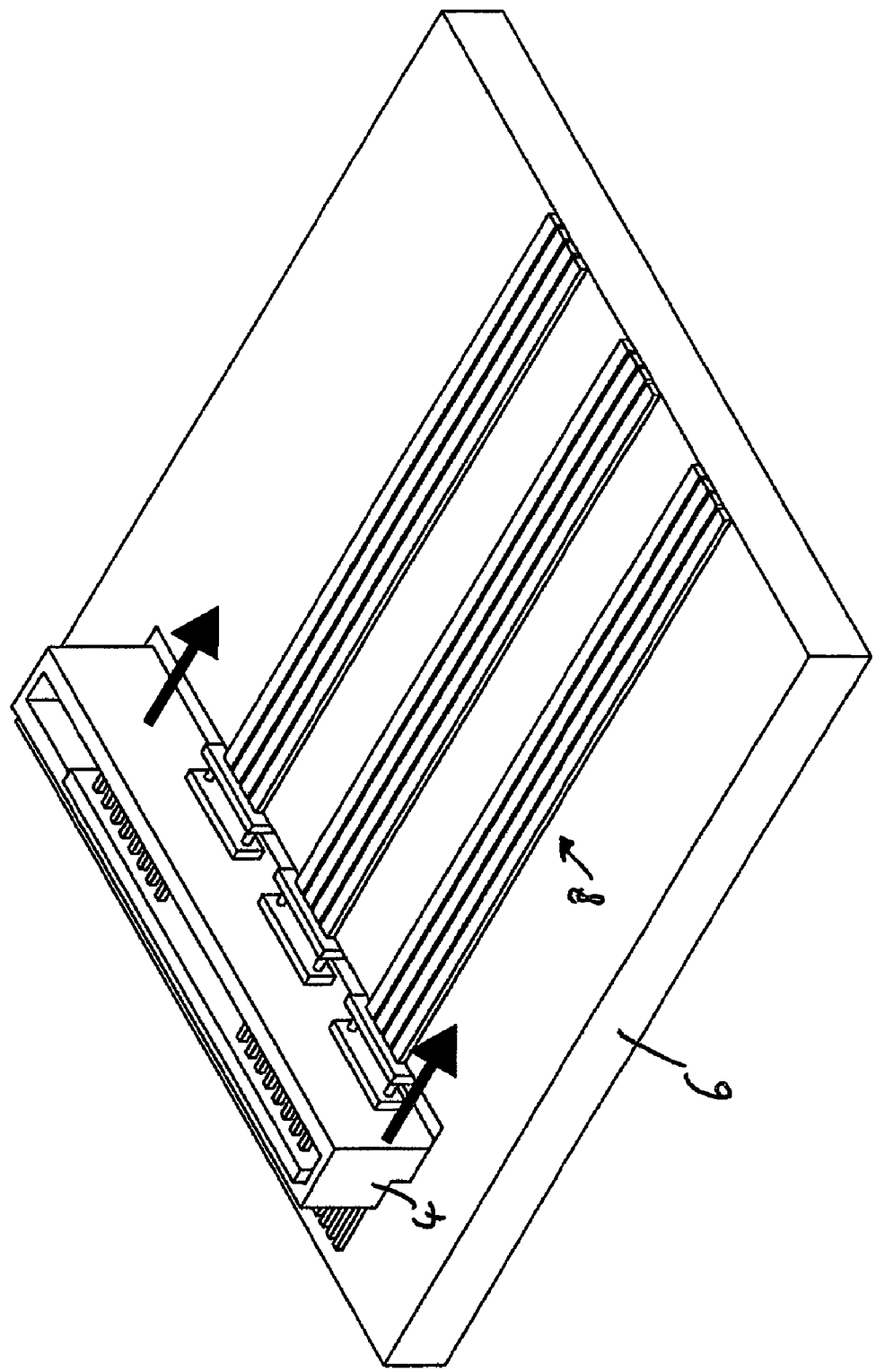
Figure 10:
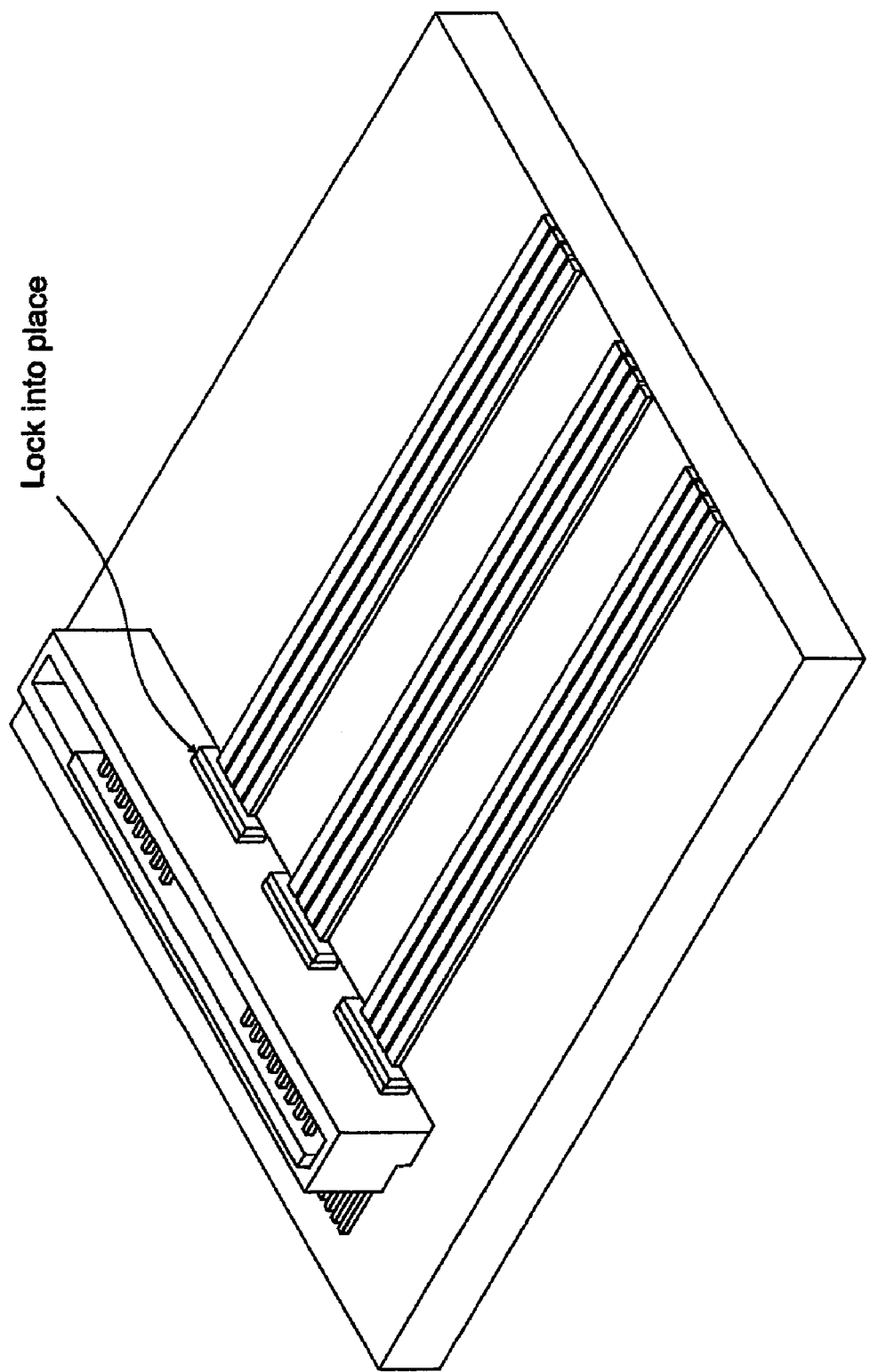

FIGS. 7 to 11 show various stages in the assembly process by which an adapter module 4 is connected and arranged on an optical backplane 6. Initially, the adapter module 4 is placed in the general vicinity of the opening within the optical backplane 6. As can be seen in FIG. 7, it is then lowered into the opening until the step 18 engages with the upper surface of the optical backplane. As shown in FIG. 8, an index matching fluid is then provided in the region between the or each of the optical interfaces on the adapter module and the or each of the corresponding optical interfaces on the waveguides 8.

The adapter module 4 is then pushed laterally towards the optical interfaces on the waveguides 8 such that the alignment features on the optical interface on the adapter module engage with corresponding alignment features on the optical interfaces on the waveguides 8. Thus, optical communication between the adapter module and the backplane 6 is established simply and conveniently without requiring a factory setting or any other such complexities. Once the optical interfaces are engaged, the adapter module 4 is, in a practical sense, locked into place although as will be explained below, it can be easily unplugged and removed from the optical backplane. This contrasts markedly with known systems, e.g. that described in U.S. Pat. No. 6,588,943, described above.

Figure 11:
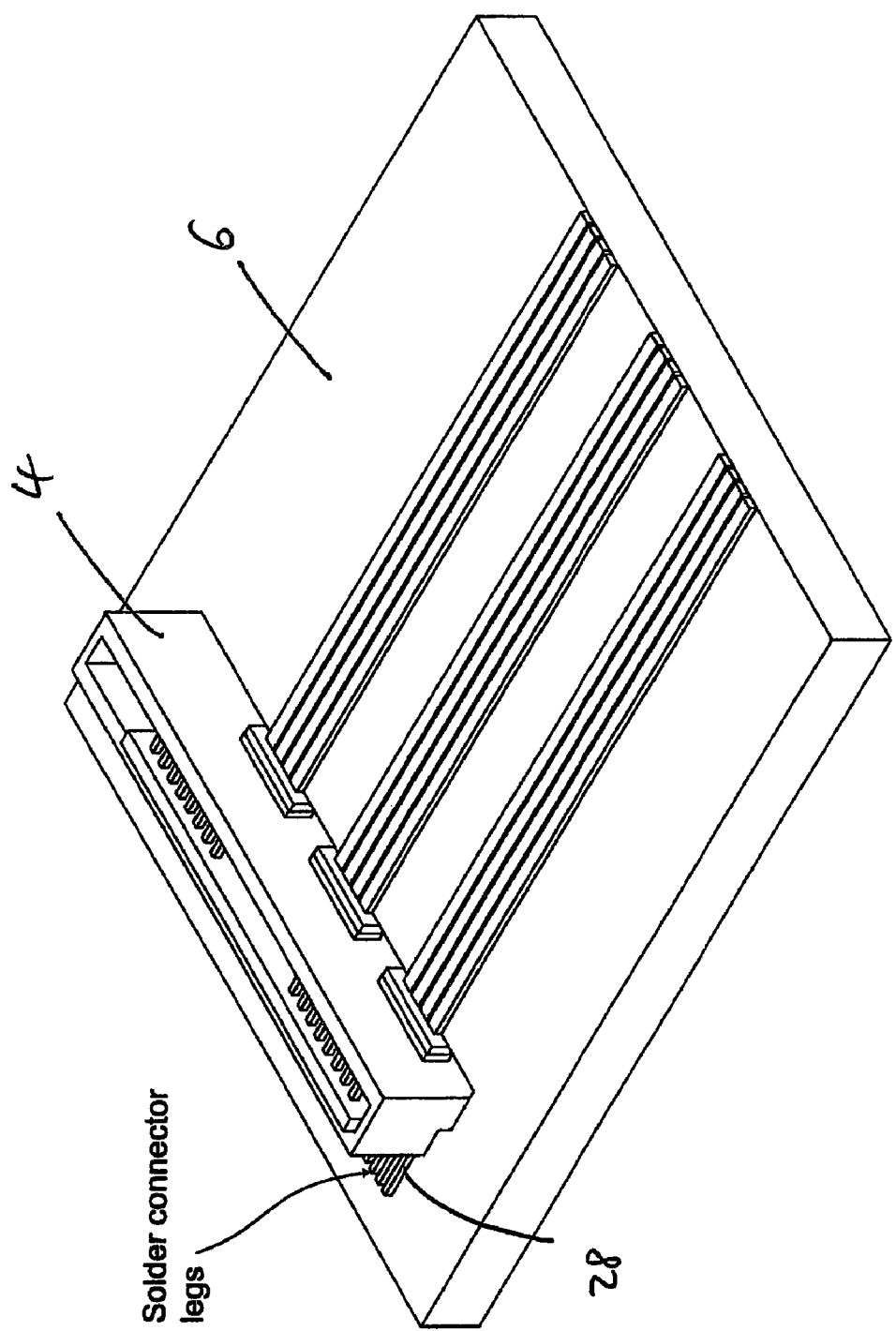

Referring now to FIG. 11, the final stage of the process of assembly of the optical backplane is the electrical connection of the legs 28 of the adapter module 4 to the optical backplane 6. These may be connected in any way that is convenient. As will be explained below, in a preferred example sockets are provided in the backplane 6 to enable the legs to be plugged into the backplane. This provides particularly convenient means by which the adapter module can be plugged and unplugged from the optical backplane.

Of course, the sockets could be provided on the adapter with corresponding protrusions being formed on the backplane or indeed a combination or mixture of these approaches could be used. What is important in this example is the pluggable and particularly easily reversible nature of the interaction between the adapter and the optical backplane or other such optical PCB. In another example, a solder connection may be used between the leg 28 on the adapter module and the optical backplane.

Figure 12:
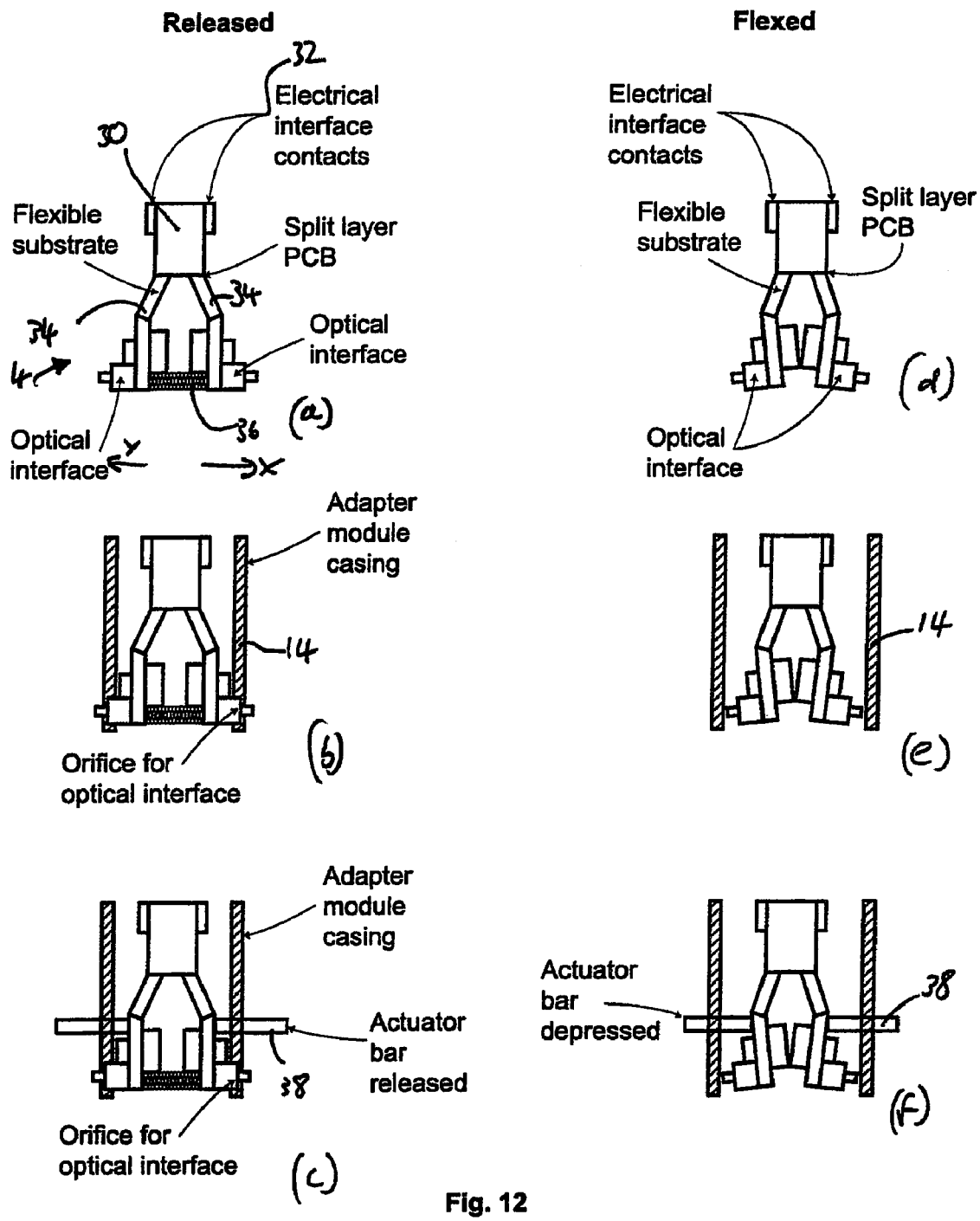

FIGS. 12(*a*) to 12(*f*) show sections through an example of an optical adapter. The adapter 4 in this example is a bi-directional adapter meaning that it has optical interfaces facing in two different (preferably but not necessarily opposite) directions. In the example shown the directions are perpendicularly opposite and are labelled as X and Y in FIG. 12(*a*).

When in use on an optical printed circuit board, the bi-directional adapter can be used to enable optical communication between adjacent daughter cards on either side of the adapter without requiring significant surface area of the backplane to enable sufficient curvature of the optical waveguides.

Referring to FIG. 12(*a*) the internal circuitry i.e. the transceiver module, of the adapter is shown. A PCB substrate 30 is provided with electrical interface contacts 32 on either side thereof. In this example, two flexible legs 34 descend from the circuit board 30. In a preferred embodiment, these flexible legs are part of the same substrate, which accommodates the whole transceiver circuit. They are created by embedding flexible PCB layers, such as Kapton polyimide into the whole substrate. In the region in which the legs are to be separately flexible, the rigid substrate layers are etched away, leaving only the flexible layers. A biasing spring 36 is provided to urge the legs 34 of the circuitry away from each other such as to engage with the housing 14 for engagement via suitable openings in the housing, with the optical interface(s) on an adjacent waveguide (not shown).

FIGS. 12(*a*), (*b*) and (*c*) show the circuitry 12 in a released state in which they will engage with the housing of the adapter module. FIGS. 12(*d*), (*e*) and (*f*) show the legs of the circuitry 12 in a flexed state in which the optical interfaces will be in a disengaged state with respect to the adapter housing 14.

In the examples shown, an actuator 38 is provided, in this particular example having the form of an actuator bar, for working against the outward-biasing force of the spring to force the legs of the circuitry 12 inwards and therefore within the outer boundary of the adapter housing. In this activated form, the outer boundary of the adapter is defined by the housing 14. Thus, it can be easily inserted into and withdrawn from a suitably sized opening on the backplane or other such optical printed circuit board to which it is to be connected. The process by which the adapter is connected to a backplane is therefore straightforward. A user simply presses inwards the actuator bar 38 to force together the legs 34. Once the legs are sufficiently forced together, the adapter can be placed within the opening on the circuit board and the actuator 38 may then be released. Thus, the optical interface(s) on the circuitry 12 will automatically and simply engage with the corresponding optical interface(s) on the optical waveguide(s) provided on the backplane.

It can be seen that in this particular embodiment, as with other embodiments described herein, the adapter is detachable from the optical backplane. No complex system is required for enabling the adapter to be removed from the backplane. The removal of the adapter from the backplane is a process which can be undertaken in a simple and straightforward manner by an end user. This is achieved merely by pressing inwards the actuator bar to retract the engagement mechanism (e.g. MT Pins) of the optical interface from the corresponding engagement mechanism on the backplane.

Figure 14:
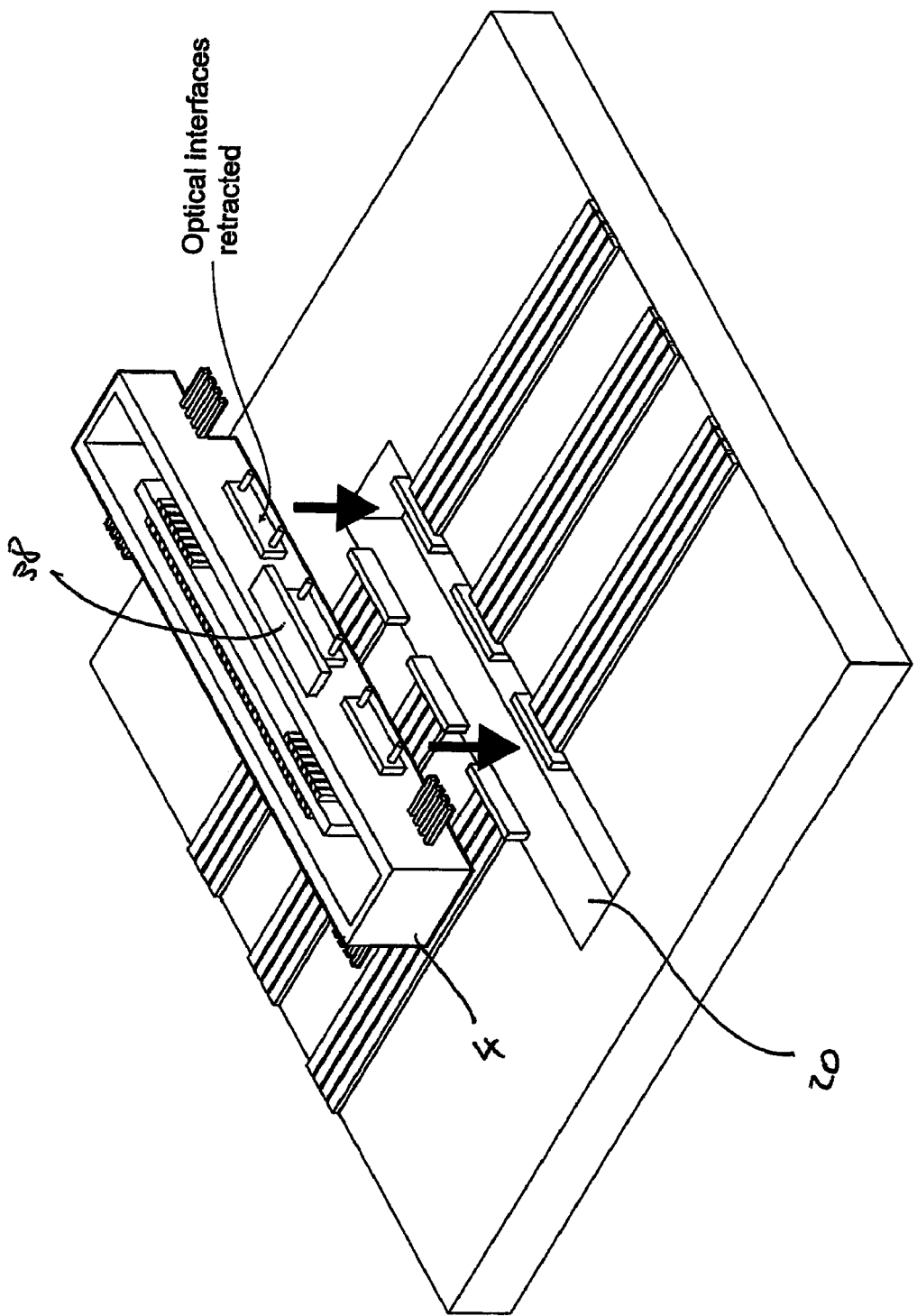

FIGS. 13 to 18 show the step by which the adapter may be fitted onto an optical backplane. With reference to FIG. 14, the actuator bar is depressed so as to withdraw sufficiently the engagement mechanism or optical interfaces on the adapter 4. The opening 20 is sized so as to be able to receive the housing of the adapter 4 whilst enabling a good optical mate between the interfaces on the housing and the interfaces on the waveguides.

Figure 15:
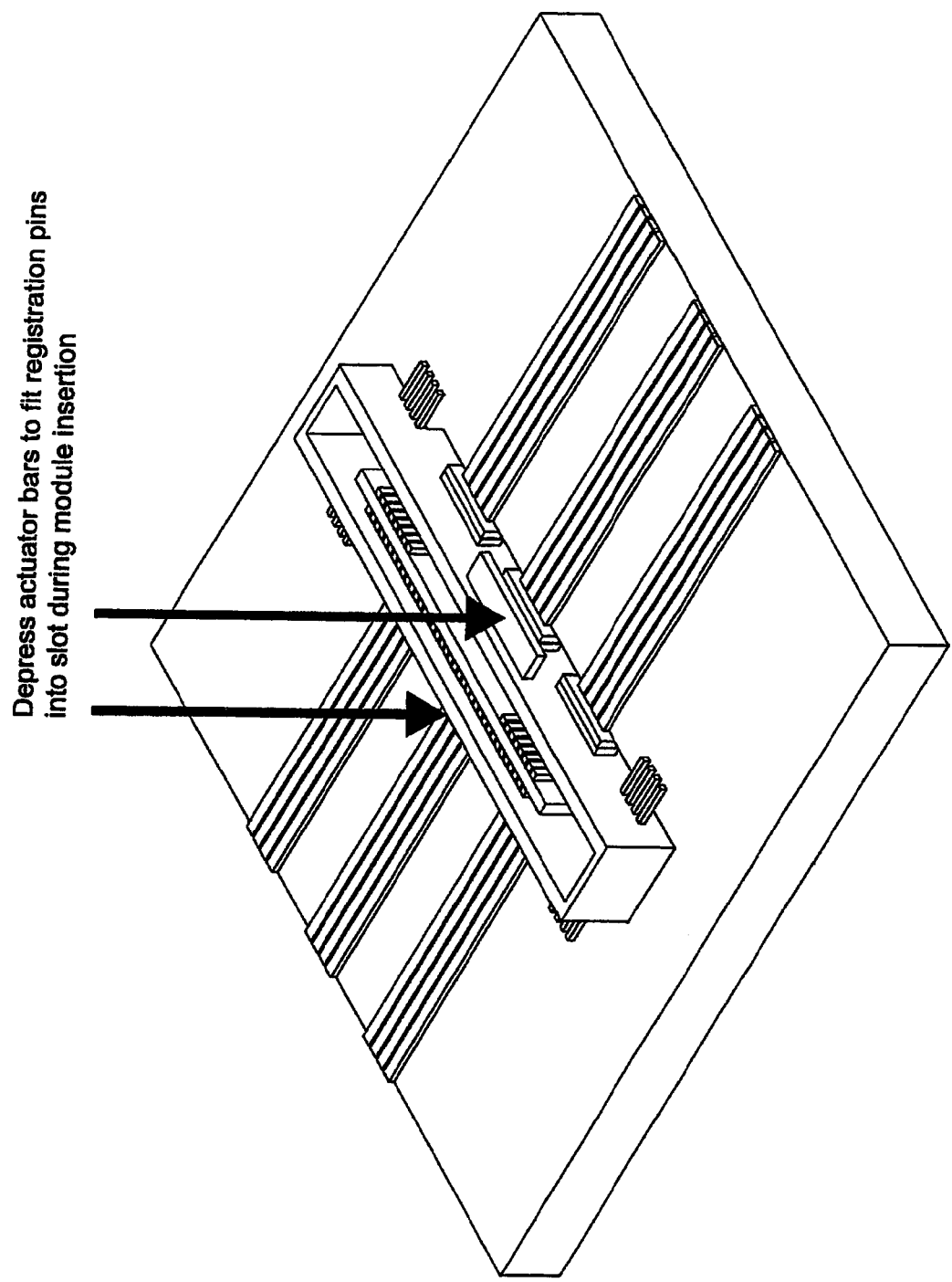

As can be seen in FIG. 15, the actuator bars are depressed to enable the registration pins of the optical interfaces on the adapter to fit into the opening 20 during the module insertion. They need not necessarily have to be capable of withdrawing within the outer boundary of the adapter module housing. It is sufficient that there is clearance between the engagement mechanism on the waveguide interfaces and those of the adapter module so as to enable free relative vertical motion of the adapter module with respect to the backplane.

Figure 16:
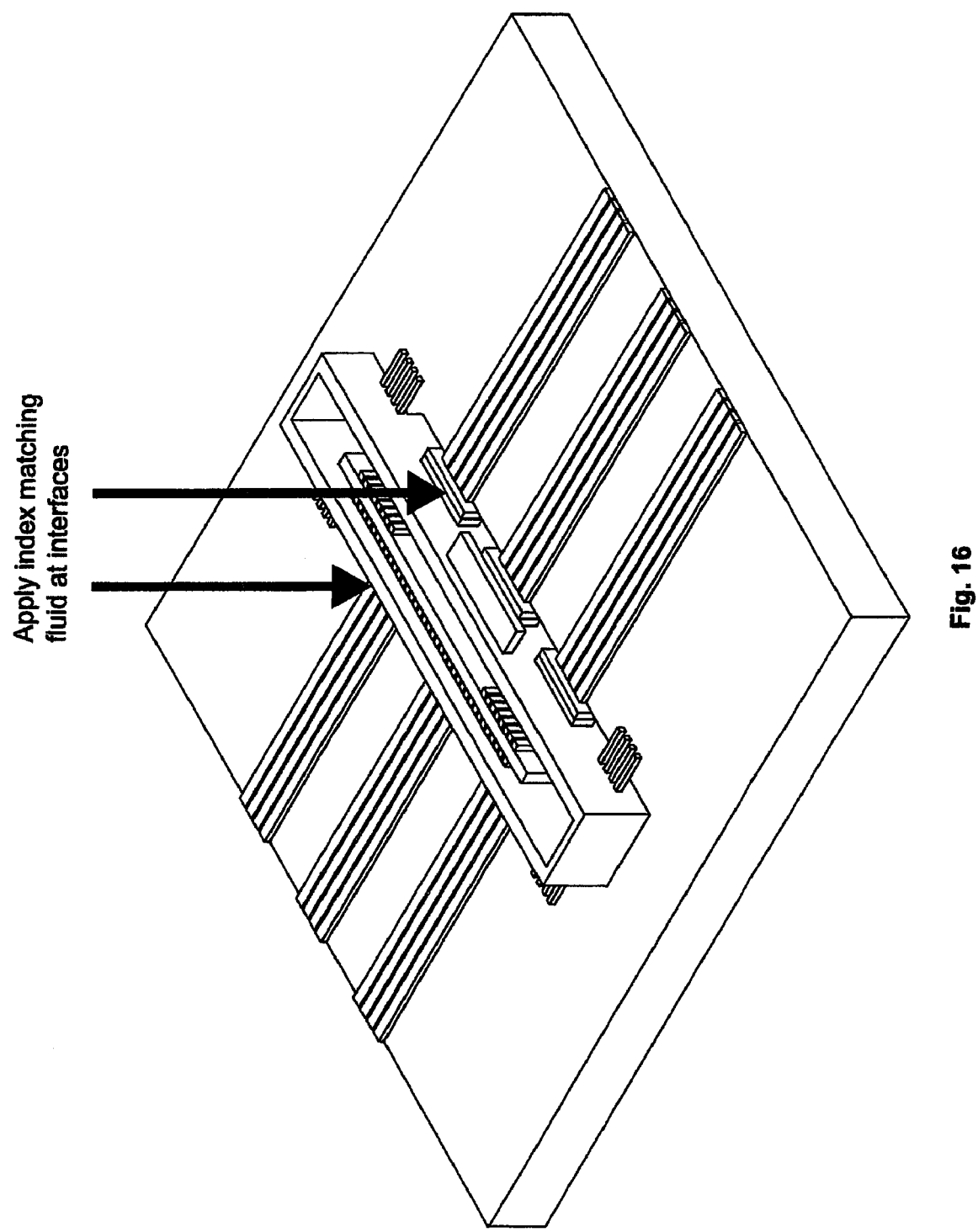
Figure 17:
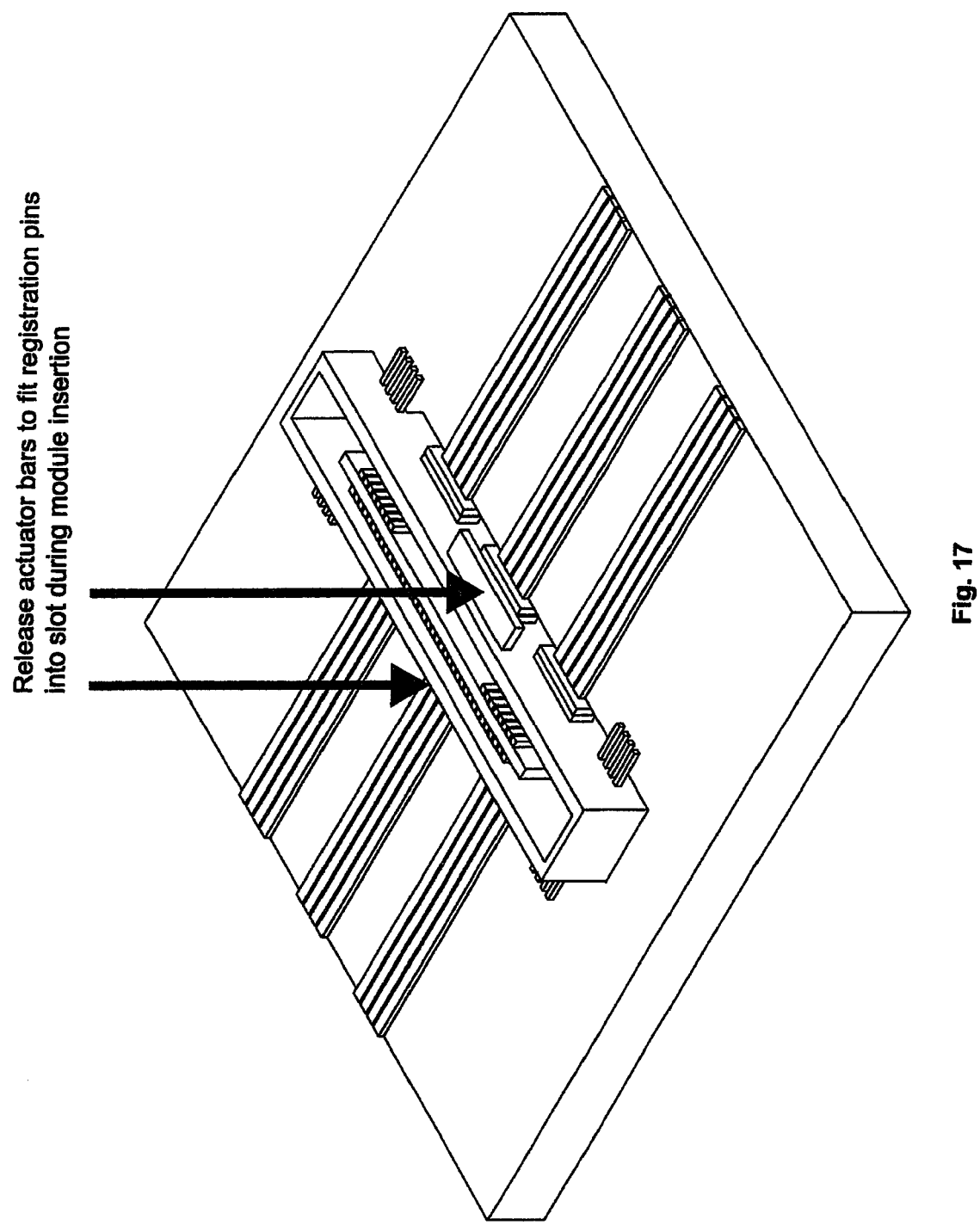
Figure 18:
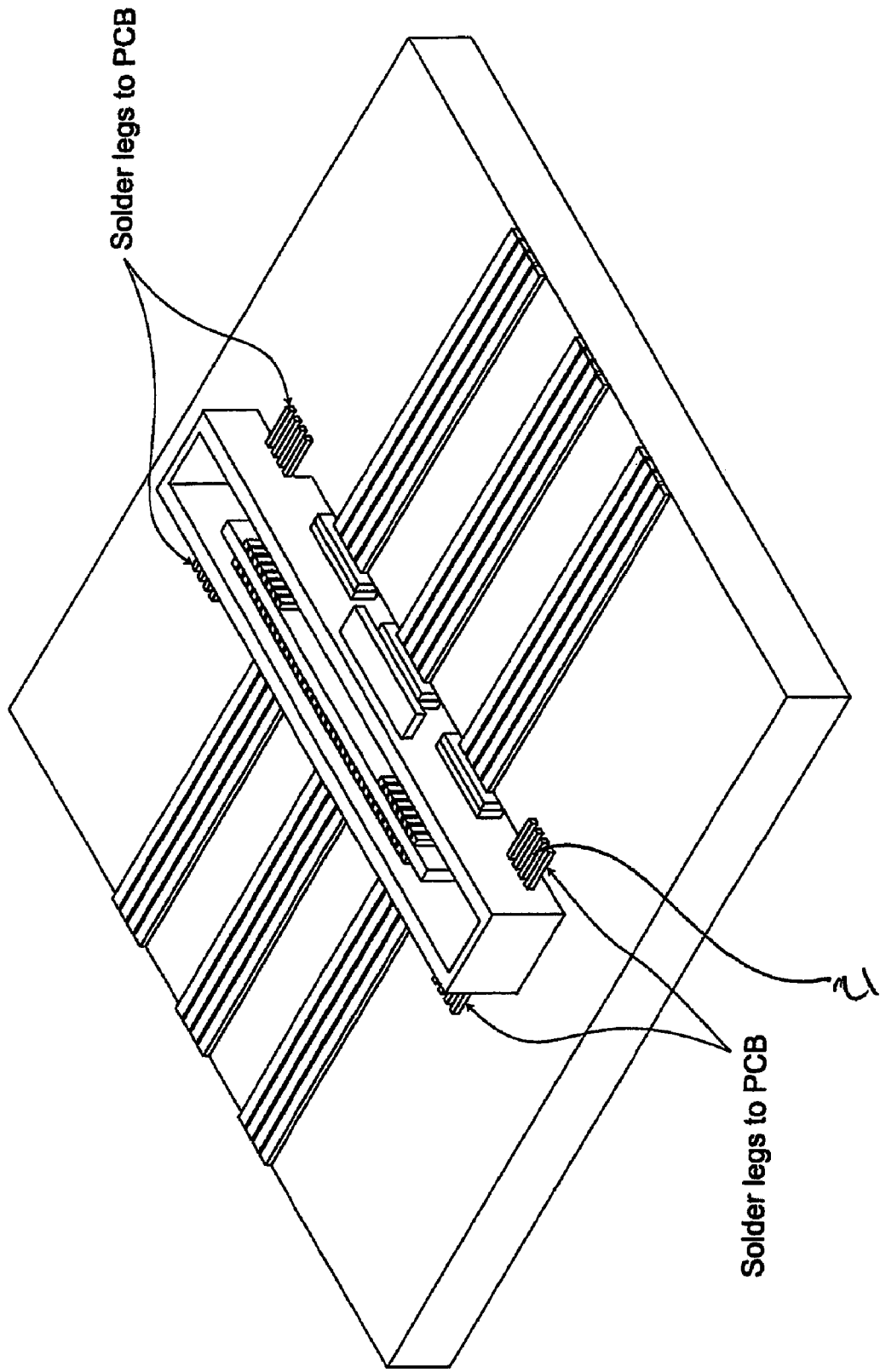

Next, as shown in FIG. 16, an index matching fluid and/or glue is provided at the interfaces. Next, the actuator bars are released to fit registration pins from the optical interfaces on the adapter housing 14 into corresponding recesses in the optical interfaces of the waveguides. Last, as shown in FIG. 18, the legs 21 of the adapter are connected in an appropriate manner to the optical backplane in such a way as to enable electrical communication between the adapter and the backplane. In one example, the legs can be soldered to the optical backplane.

As will be explained below, with reference to FIGS. 26 to 30, the legs 21 are arranged so as to point in the same way as the direction of insertion of the adapter into the backplane. This enables a plug and socket configuration to be used for the legs. Thus, the insertion or removal of the adapter from the backplane is merely a plug/socket type of interaction.

FIGS. 19(*a*) to 19(*f*) show a second example of a bi-directional adapter. In this example, instead of an actuator bar being provided, a locking key and gear 40 is provided. The process by which the adapter may be connected to the backplane can be understood with reference to FIG. 20. A locking bar and tool inlet 40 is provided. A gear (not shown) is provided together with a connector at the bottom end of the locking bar and tool inlet. When a suitable tool is inserted into the inlet 40 and rotated, the gear will be rotated. A coupling mechanism is provided by which when the gear is rotated a suitably shaped cam (not shown) is rotated to force apart the legs of the optical transceiver card in the same manner as achieved by the biasing spring described above.

Again therefore, the means by which the adapter is connected with the optical backplane is extremely straightforward and can be achieved by a user at home. In both cases, means is provided for forcing outwardly the legs of the optical transceiver circuitry so as to cause engagement of the optical interface of the optical transceiver circuitry with the optical interfaces of the waveguides. In the example shown in FIGS. 19(a) to 19(f) the biasing spring will act to pull inwards the legs of the transceiver module. It is of course possible that in the example of FIG. 19 the biassing works in the same way as described above with reference to FIGS. 12(a) to 12(f). The arrangement and configuration of the locking key and gear and cam arrangement would be selected accordingly.

In one example the means is an actuator bar in combination with a biasing spring and in another example the means is a gear and cam arrangement. Any other suitable means may also be used.

Figure 23:
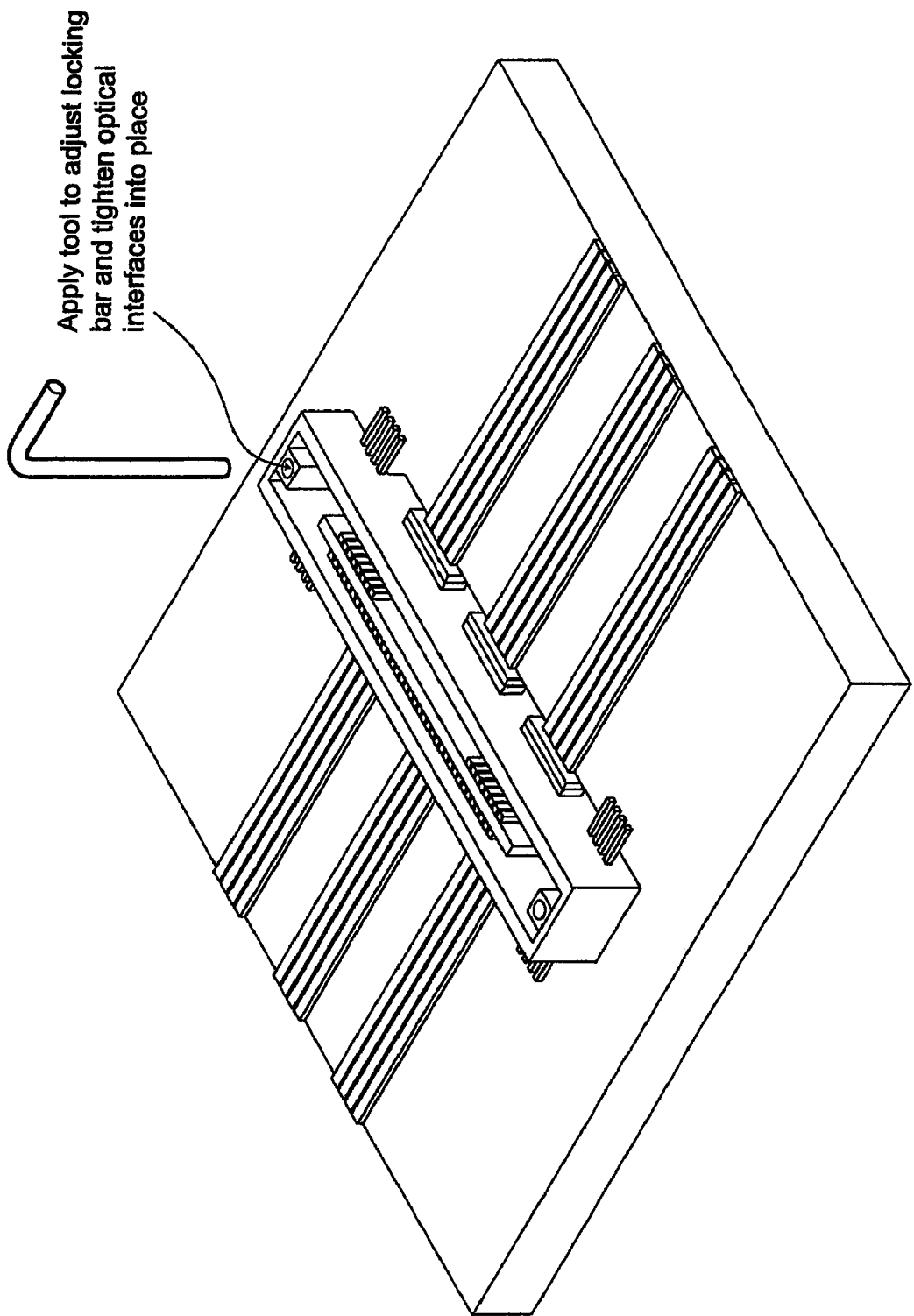
Figure 24:
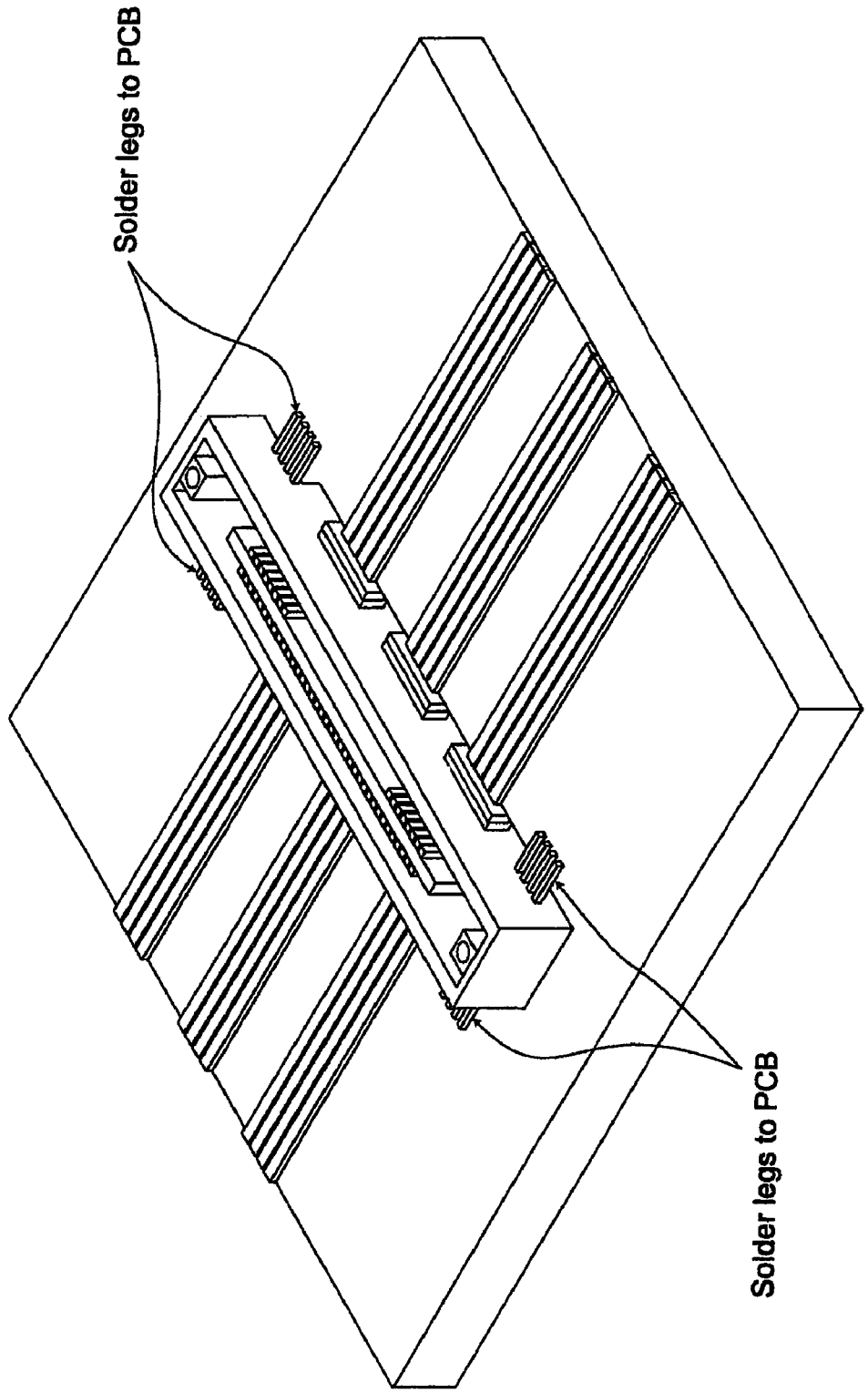

In FIG. 23, an example of a suitable tool for engagement with the locking bar and tool inlet 40 is shown. An allen key or a screwdriver may be used, or indeed any other suitable tool.

FIGS. 25 to 30 show an example of an optical adapter in which the electrical connectors or legs extend in the direction of insertion of the adapter into an opening on an optical PCB such as an optical backplane. Thus, the act of engaging the optical adapter with the backplane is a straightforward plugging type of action. If any fault develops with the adapter then it can be removed in a simple and straightforward manner for replacement by unplugging. The combination of the adapter and the backplane or PCB does not need to be undertaken in any special manner e.g. at a factory setting or in a clean room. It is an operation that can easily take place under the management of an end user.

FIGS. 26 and 27 show locking key and actuator bar versions, respectively, of the apparatus of FIG. 25.

With reference to FIG. 28, through holes 44 are provided in the optical backplane for receiving the legs 28 of the optical adapter 4.

Where the term "vertical" is used herein with reference to the insertion or removal of an adapter from an optical PCB, it is used in a generic sense to mean including a significant perpendicular component relative to the major surface of the PCB.

Embodiments of the present invention have been described with particular reference to the examples illustrated. However, it will be appreciated that variations and modifications may be made to the examples described within the scope of the present invention.

The invention claimed is:

1. An adapter for an optical printed circuit board, the adapter comprising:
   a socket for receiving a daughter card for connecting to a said optical printed circuit board; and
   a connector for engagement with the optical printed circuit board arranged such that when the connector engages with the optical printed circuit board an optical connection is established between the optical printed circuit board and the adapter,
   an actuator, upon actuation of which the optical connection may be established or broken, in which the connector is biased to establish an optical connection with the optical printed circuit board when inserted and the actuator enabling a user to counteract the bias.

2. An adapter according to claim 1, comprising an optical interface for engagement with a corresponding optical interface on a light guide on the optical printed circuit board on which, in use, the adapter is arranged.

3. An adapter according to claim 1, comprising an actuator, upon actuation of which the optical connection may be established or broken.

4. An adaptor according to claim 1, comprising a transceiver module for receiving electrical signals and converting these to optical signals and vice versa.

5. An adapter according to claim 4, in which the transceiver module has a controller for regulation thereof.

6. An adaptor according to claim 4, in which the transceiver module is arranged on a PCB substrate.

7. An adapter for an optical printed circuit board, the adapter comprising:
   a socket for receiving a daughter for connecting to a said optical printed circuit board; and
   a connector for engagement with the optical printed circuit board arranged such that when the connector engages with the optical printed circuit board an optical connection is established between the optical printed circuit board and the adapter,
   the adapter comprising a transceiver module for receiving electrical signals and converting these to optical signals and vice versa,
   in which the transceiver module is arranged on a PCB substrate,
   in which the PCB substrate is a flexible PCB substrate.

8. An adapter according to claim 3, in which the transceiver module comprises electrical contacts for making electrical contact with a daughter card when inserted into the adapter.

9. An adapter according to claim 1, comprising electrical contacts for providing a passage for electrical signals from the adapter to an optical PCB on which it is, in use, arranged.

10. An adapter according to claim 9, in which the electrical contacts are arranged to have a pluggable interaction with corresponding contacts on an optical PCB on which, in use, the adapter is arranged.

11. An adapter according to claim 1, in which the adapter is a bidirectional adapter enabling connection to waveguides extending in at least two different directions on the optical PCB on which, in use, the adapter is arranged.

12. An adapter according to claim 1, in which the adapter has plural sets of optical interfaces, each defined within a corresponding matable connector.

13. An adapter according to claim 12, in which each matable connector is an MT or other such type of connector.

14. An adapter according to claim 12, in which a single controller is configured to control each of the plural sets of optical interfaces.

15. An adapter according to claim 11, in which the transceiver module comprises two or more legs, each for supporting an optical interface.

16. An adapter according to claim 15, in which the supported optical interfaces face in different, preferably opposite, directions.

17. An adapter according to claim 15, comprising one or more components for biassing the legs apart from or towards each other.

18. An adapter according to claim 17, wherein the actuator, when actuated, is arranged to act against the bias introduced by the one or more biassing components.

19. An adapter according to claim 1, in which the transceiver module comprises electrical contacts for making electrical contact with a daughter card which is, in use, inserted into the adapter.

20. An adapter, comprising:
a socket for receiving a daughter card for connecting to a said optical printed circuit board; and
a connector for engagement with the optical printed circuit board arranged such that when the connector engages with the optical printed circuit board an optical connection is established between the optical printed circuit board and the adapter,
comprising an actuator, upon actuation of which the optical connection may be established or broken,
in which the actuator comprises one or more of an actuator bar and a locking key and gear arrangement.

21. An assembly, comprising:
an optical printed circuit board having one or more optical signal carriers for the passage of optical signals therethrough and electrical paths for the passage of electrical signals; and, an adapter for an optical printed circuit board, the adapter comprising:
a socket for receiving a daughter card for connecting to a said optical printed circuit board; and
a connector for engagement with the optical printed circuit board arranged such that when the connector engages with the optical printed circuit board an optical connection is established between the optical printed circuit board and the adapter,
the adapter comprising an actuator, upon actuation of which the optical connection may be established or broken, in which the connector is biased to establish an optical connection with the optical printed circuit board when inserted and the actuator enabling a user to counteract the bias.

22. A method of assembling an optical printed circuit board assembly, comprising:
providing an optical printed circuit board;
providing an adapter for an optical printed circuit board, the adapter comprising:
a socket for receiving a daughter card for connecting to a said optical printed circuit board; and
a connector for engagement with the optical printed circuit board arranged such that when the connector engages with the optical printed circuit board an optical connection is established between the optical printed circuit board and the adapter,
wherein the adapter comprises an actuator, upon actuation of which the optical connection may be established or broken, in which the connector is biased to establish an optical connection with the optical printed circuit board when inserted and the actuator enabling a user to counteract the bias, and,
connecting said adapter to the optical printed circuit board to establish optical connection between the adapter and the optical printed circuit.

* * * * *